(12) United States Patent
Warashina et al.

(10) Patent No.: US 11,192,325 B2
(45) Date of Patent: Dec. 7, 2021

(54) HYGIENIC THIN-LEAF PAPER

(71) Applicant: DAIO PAPER CORPORATION, Ehime (JP)

(72) Inventors: Shinichi Warashina, Shizuoka (JP); Hirohiko Kato, Shizuoka (JP)

(73) Assignee: DAIO PAPER CORPORATION, Ehime (JP)

( * ) Notice: Subject to any disclaimer, the term of this patent is extended or adjusted under 35 U.S.C. 154(b) by 80 days.

(21) Appl. No.: 16/640,173

(22) PCT Filed: Aug. 29, 2018

(86) PCT No.: PCT/JP2018/031954
§ 371 (c)(1),
(2) Date: Feb. 19, 2020

(87) PCT Pub. No.: WO2019/044908
PCT Pub. Date: Mar. 7, 2019

(65) Prior Publication Data
US 2020/0171783 A1    Jun. 4, 2020

(30) Foreign Application Priority Data

Aug. 31, 2017  (JP) .............................. JP2017-167503

(51) Int. Cl.
*B32B 3/30*        (2006.01)
*B32B 29/00*       (2006.01)

(52) U.S. Cl.
CPC .............. *B32B 3/30* (2013.01); *B32B 29/005* (2013.01); *B32B 2554/00* (2013.01); *B32B 2555/00* (2013.01)

(58) Field of Classification Search
CPC ................ B31F 1/07; B31F 2201/0735; B31F 2201/0738; B31F 2201/0756;
(Continued)

(56) References Cited

U.S. PATENT DOCUMENTS 3,694,300 A    9/1972 Small
4,543,142 A    9/1985 Kuepper et al.
(Continued)

FOREIGN PATENT DOCUMENTS

EP    2095935 A1 *  2/2009
JP    S48-033161    5/1973
(Continued)

OTHER PUBLICATIONS

International Search Report dated Oct. 30, 2018 with respect to PCT/JP2018/031954.
(Continued)

*Primary Examiner* — Lawrence D Ferguson
(74) *Attorney, Agent, or Firm* — IPUSA, PLLC

(57) ABSTRACT

A hygienic thin-leaf paper includes a first sheet (10) including first embossed regions (30) in each of which first embossed protrusions (31) and first non-embossed protrusions (32) are included, the first sheet including first non-embossed regions (50) in each of which a first embossed protrusion (31) and a first non-embossed protrusion (32) are not included; and a second sheet (20) including second embossed regions (40) in each of which second embossed protrusions (41) and second non-embossed protrusions (42) are included, the second sheet including second non-embossed regions (60) in each of which a second embossed protrusion (41) and a second non-embossed protrusion (42) are not included. The first sheet (10) and the second sheet (20) are integrally laminated, the first embossed protrusions (31) include multiple first dotted embossed protrusions (31A) and multiple first linear embossed protrusions (31B), and the second embossed protrusions (41) include multiple second dotted embossed protrusions (41A) and multiple second linear embossed protrusions (41B). Each first non-embossed region (50) faces a given second linear embossed (Continued)

protrusion (41B), and each second non-embossed region (60) faces a given first linear embossed protrusion (31B).

20 Claims, 20 Drawing Sheets

(58) Field of Classification Search
CPC ......... B31F 2201/0769; B32B 2250/02; B32B 2250/26; B32B 2307/718; B32B 2307/726; B32B 2307/728; B32B 2432/00; B32B 2554/00; B32B 2555/00; B32B 29/005; B32B 3/30; B32B 7/12; D21H 27/002; D21H 27/02; D21H 27/30
See application file for complete search history.

(56) References Cited

U.S. PATENT DOCUMENTS

| | | |
|---|---|---|
| 5,840,404 A | 11/1998 | Graff |
| 6,395,133 B1 | 5/2002 | McNeil |
| 8,409,404 B2 | 4/2013 | Harper et al. |
| 2012/0114908 A1 | 5/2012 | Barredo |
| 2012/0244320 A1 | 9/2012 | Sauter et al. |

FOREIGN PATENT DOCUMENTS

| | | |
|---|---|---|
| JP | S61-033628 | 2/1986 |
| JP | H06-028951 | 4/1994 |
| JP | H09-503030 | 3/1997 |
| JP | 2003-116741 | 4/2003 |
| JP | 2004-244772 | 9/2004 |
| JP | 2008-113695 | 5/2008 |
| JP | 2008-208501 | 9/2008 |
| JP | 2010-148803 | 7/2010 |
| JP | 2010-234758 | 10/2010 |
| JP | 2013-208298 | 10/2013 |
| JP | 2017-063894 | 4/2017 |

OTHER PUBLICATIONS

Extended European Search Report for 18850368.4 dated Apr. 14, 2021.

* cited by examiner (A)

(B)

(C)

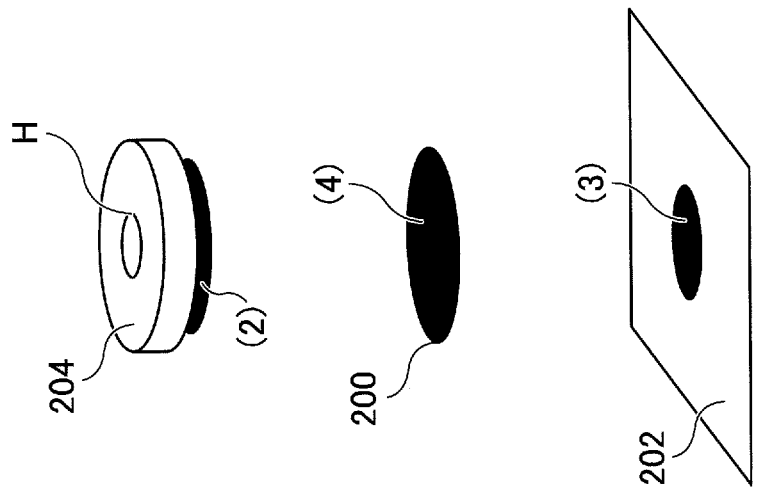
FIG.14
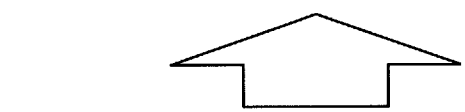
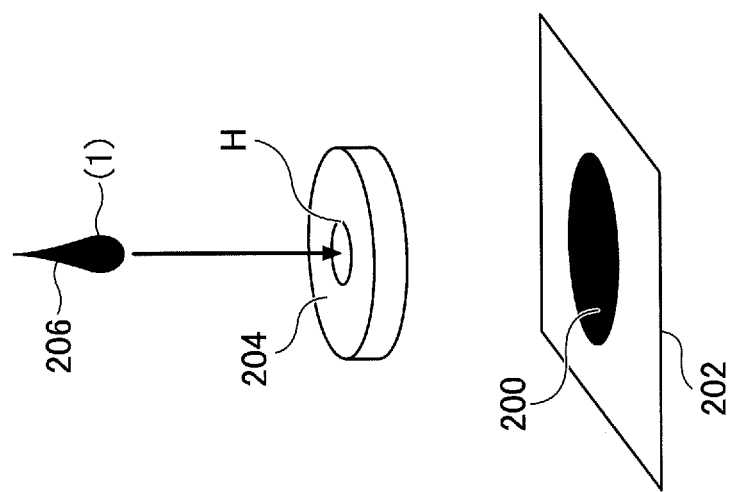

HYGIENIC THIN-LEAF PAPER

TECHNICAL FIELD

The present invention relates to hygienic thin-leaf paper.

BACKGROUND ART

Hygienic thin-leaf paper such as a paper towel is known to have laminated sheets such as embossed crepe paper. For conventional hygienic thin-leaf paper, a space (embossed space) is formed between sheets having embossed recesses and protrusions. Moisture or oil is absorbed in the embossed space formed between such sheets, so that an absorption performance of oil or the like is provided.

Additionally, for this kind of hygienic thin-leaf paper, in order to improve a design and an absorption performance, a space (non-embossed space), in which portions (or regions) that are respective sheets and that do not include an embossed recess and a protrusion face each other, is formed. For conventional hygienic thin-leaf paper, oil or the like passes through such a non-embossed space, so that the oil or the like is diffused.

For example, FIG. 2 in Unexamined Patent Application Publication No. H6-28951 (Patent document 1) discloses hygienic paper such as a paper towel having a laminated structure in which tops of embossed protrusions of two sheets of crepe paper face each other and are bonded. Such a laminated structure type is called a tip-to-tip (TIP to TIP) type.

Additionally, U.S. Pat. No. 8,409,404 (Patent document 2) discloses a paper towel having a laminated structure, in which protrusions are alternately arranged to be bonded such that a top of a protrusion of one sheet of crepe paper is positioned in a portion (when viewed from an opposite-side one sheet, or a non-embossed protrusion, a portion having no protrusion) having no protrusion of another sheet of crepe paper. Such a laminated structure type is called a nested (Nested) type.

CITATION LIST

Patent Document

[Patent Document 1] Japanese Unexamined Patent Application Publication No. H6-28951
[Patent Document 2] U.S. Pat. No. 8,409,404

SUMMARY OF INVENTION

Problem to be Solved by the Invention

However, for hygienic thin-leaf paper having a tip-to-tip type laminated structure, although diffusivity of oil or the like is improved because a space volume of an embossed space is increased. However, an embossed space is easily collapsed and thus strength in a lamination direction (thickness direction) is reduced. For this reason, when hygienic thin-leaf paper is used (e.g., when a fried food item is placed on a paper towel laid on a dish), there is a problem that an embossed space is collapsed due to a load being applied and that an absorption performance cannot be maintained, such as absorbed oil or the like seeping through the back (e.g., a dish on which a paper towel is placed) of the sheet of hygienic thin-leaf paper.

Additionally, for hygienic thin-leaf paper having a nested type laminated structure, compared to a tip-to-tip type laminated structure, an embossed space is not easily collapsed and thus strength in a thickness direction is increased. For this reason, although a seep-through is not easily caused under load, there is a problem that diffusivity of oil or the like is decreased due to a small space volume of an embossed space.

Means for Solving Problems

An objective of the present invention is to provide hygienic thin-leaf paper with excellent diffusivity as well as maintaining an absorption performance under load.

According to one aspect of the present invention, a hygienic thin-leaf paper includes: a first sheet including one or more first embossed regions in each of which one or more first embossed protrusions and one or more first non-embossed protrusions are included, the first sheet including one or more first non-embossed regions in each of which a first embossed protrusion and a first non-embossed protrusion are not included; a second sheet including one or more second embossed regions in each of which one or more second embossed protrusions and one or more second non-embossed protrusions are included, the second sheet including one or more second non-embossed regions in each of which a second embossed protrusion and a second non-embossed protrusion are not included, wherein the first sheet and second sheet are integrally laminated, wherein the first embossed protrusion includes multiple first dotted embossed protrusions and multiple first linear embossed protrusions, wherein the second embossed protrusions include multiple second dotted embossed protrusions and multiple second linear embossed protrusions, wherein each first non-embossed region faces a given second linear embossed protrusion, and wherein each second non-embossed region faces a given first linear embossed protrusion.

Advantageous Effects of Invention

According to one aspect of the present invention, it is possible to provide hygienic thin-leaf paper with excellent diffusivity as well as maintaining an absorption performance under load.

BRIEF DESCRIPTION OF DRAWINGS

FIG. 4 (B) is a cross-sectional view taken along the line 4B of FIG. 1; and FIG. 4 (C) is a cross-sectional view taken along the line 4C of FIG. 1;

FIG. 14 is a diagram for explaining a test method of an absorption test;

DESCRIPTION OF EMBODIMENTS

Figure 1:
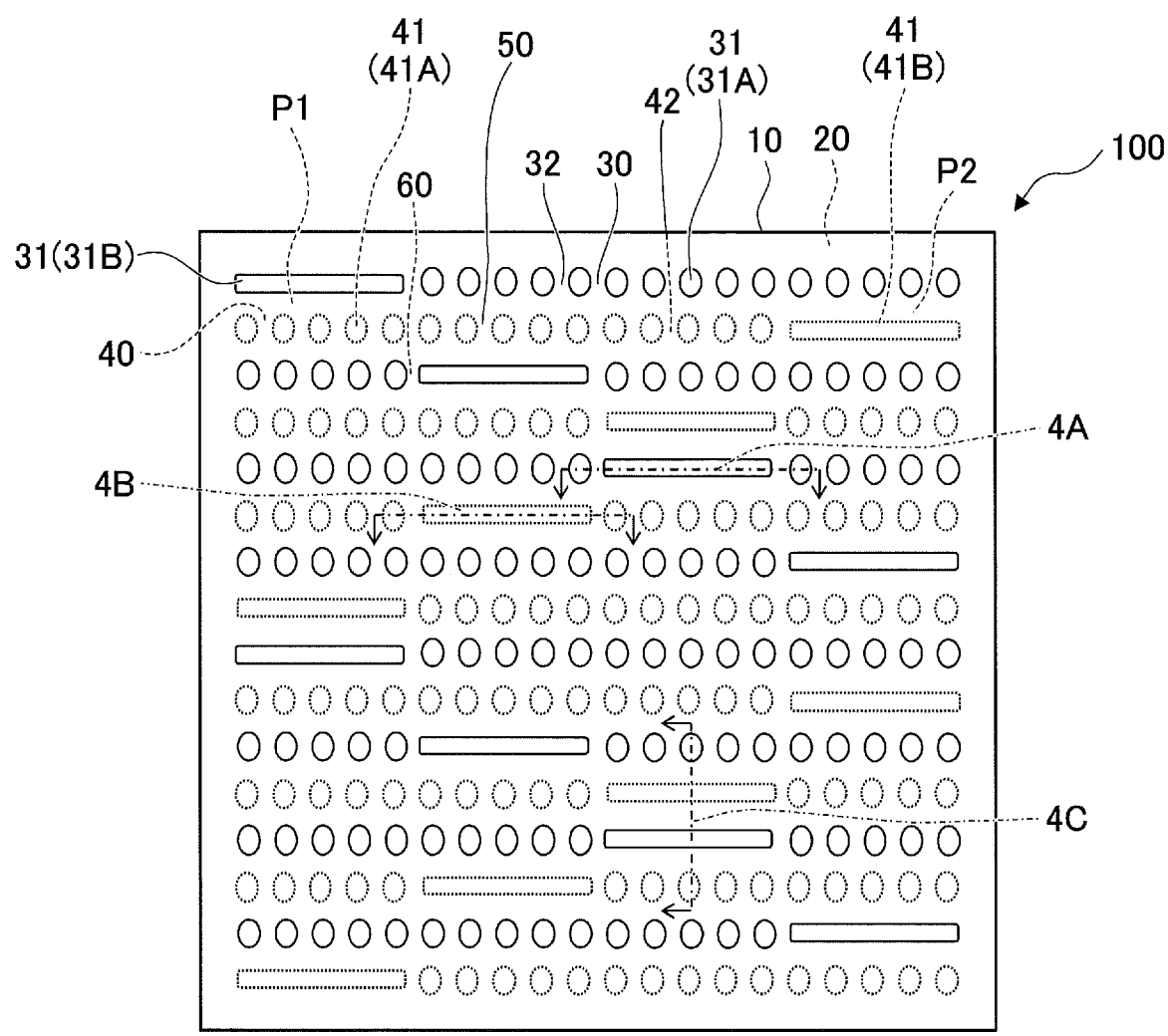
FIG. 1 is a diagram schematically illustrating hygienic thin-leaf paper according to an embodiment of the present invention.

According to a first aspect of the present invention, a hygienic thin-leaf paper includes: a first sheet including one or more first embossed regions in each of which one or more first embossed protrusions and one or more first non-embossed protrusions are included, the first sheet including one or more first non-embossed regions in each of which a first embossed protrusion and a first non-embossed protrusion are not included; a second sheet including one or more second embossed regions in each of which one or more second embossed protrusions and one or more second non-embossed protrusions are included, the second sheet including one or more second non-embossed regions in each of which a second embossed protrusion and a second non-embossed protrusion are not included, wherein the first sheet and the second sheet are integrally laminated, wherein the first embossed protrusions include multiple first dotted embossed protrusions and multiple first linear embossed protrusions, wherein the second embossed protrusions include multiple second dotted embossed protrusions and multiple second linear embossed protrusions, wherein each first non-embossed region faces a given second linear embossed protrusion, and wherein each second non-embossed region faces a given first linear embossed protrusion.

According to the first aspect, the first embossed protrusions include multiple first dotted embossed protrusions and multiple first linear embossed protrusions; and the second embossed protrusions include multiple second dotted embossed protrusions and multiple second linear embossed protrusions. Thereby, moisture or oil (hereinafter referred to as oil or the like) is absorbed into multiple first dotted embossed protrusions on a first sheet side and multiple second linear embossed protrusions on a second sheet side. Accordingly, the oil or the like absorbed between a first sheet and a second sheet can be retained.

Additionally, according to the first aspect, each first non-embossed region of a first sheet faces a given second linear embossed protrusion of a second sheet; and each second non-embossed region of a second sheet faces a given first linear embossed protrusion of a first sheet. Thereby, each first non-embossed region on a first sheet side is supported in a thickness direction of the hygienic thin-leaf paper, by a given second linear embossed protrusion on a second sheet side. Further, each second non-embossed region on a second sheet side is supported in a thickness direction of the hygienic thin-leaf paper, by a given first linear embossed protrusion on a first sheet side.

Further, according to the first aspect, each first non-embossed region of a first sheet does not face a given second non-embossed region of a second sheet. Thereby, a non-embossed space (a space that is formed by non-embossed regions facing each other and that is easily collapsed under load applied in a thickness direction) is not formed between a first sheet and a second sheet.

In such a configuration, in the first aspect, an embossed space is not easily collapsed, and thus strength in a thickness direction with respect to a load can be increased. Thereby, in the first aspect, oil or the like bleeding or seeping through, etc. is reduced, and reductions in retention of absorbed oil or the like can be avoided. Accordingly, according to the first aspect, an absorption performance under load can be maintained.

With each first non-embossed region facing a given second linear embossed protrusion; and each second non-embossed region facing a given first linear embossed protrusion; each passage is formed along a given first linear embossed protrusion; and each passage is formed along a given second linear embossed protrusion, between a first sheet and a second sheet. Thereby, between a first sheet and a second sheet, oil or the like absorbed between the first sheet and the second sheet can move through a passage formed along a first linear embossed protrusion and a passage formed along a second linear embossed protrusion. Accordingly, according to the first aspect, diffusivity of absorbed oil or the like can be improved.

Note that with respect to conventional hygienic thin-leaf paper, the presence of a non-embossed space allows for improvements in a design (or which may be referred to as design pattern). In contrast, in the first aspect, such a non-embossed space does not exist. However, in the first aspect, non-embossed regions and linear embossed regions allow for a similar level of a design to a case of a non-embossed space. For this reason, a design can be created even when there is no non-embossed space between a first sheet and a second sheet.

According to a second aspect of the present invention, with respect to a hygienic thin-leaf paper, either or both of the first linear embossed protrusions and the second linear embossed protrusions include respective curved portions. According to the second aspect, with linear embossed protrusions including such curved portions, curved passages are each formed along one or more given embossed protrusions, between a first sheet and a second sheet. Thereby, absorbed oil or the like moves along one or more curved passages and thus a direction of the oil or the like moving between a first sheet and a second sheet can be changed. Accordingly, according to the second aspect, diffusivity of oil or the like can be further improved.

According to a third aspect of the present invention, with respect to a hygienic thin-leaf paper, either or both of the first linear embossed protrusions and the second linear embossed protrusions include pairs each including two linear embossed protrusions in parallel. According to the third aspect, with such two linear embossed protrusions in parallel being present, the number of passages each of which is formed along a given embossed protrusion and between a first sheet and a second sheet can be increased. Thereby, because an amount of oil or the like being able to move between a first sheet and a second sheet is increased, diffusivity of oil or the like can be further improved.

According to a fourth aspect of the present invention, with respect to a hygienic thin-leaf paper, either or both of the first linear embossed protrusions and the second linear embossed protrusions include pairs each including intersecting two linear embossed protrusions. According to the fourth aspect, with intersecting two linear embossed protrusions, an intersection of a linear embossed protrusion is formed between a first sheet and a second sheet. Further, with such an intersection of a linear embossed protrusion, a non-embossed region is supported in a thickness direction of the hygienic thin-leaf paper. Thereby, strength in a thickness direction of the hygienic thin-leaf paper with respect to a load can be increased, and an absorption performance can be improved accordingly.

Additionally, at such an intersection of the linear embossed protrusion, a direction of absorbed oil or the like moving can be reliably changed. Thereby, according to the fourth aspect, diffusivity of oil or the like can be further improved.

Further, if a passage formed between a first sheet and a second sheet is excessively long, oil or the like is maintained in the passage, and thus reductions in diffusivity of the oil or the like occur, which might result in a bleed of oil or the like. In contrast, according to the fourth aspect, with such an intersection of the linear embossed protrusion, a passage formed between a first sheet and a second sheet is partitioned. Thus, a passage can be prevented from being excessively long. Thereby, oil or the like is prevented from being maintained between a first sheet and a second sheet. Accordingly, diffusivity can be reliably improved, as well as maintaining an absorption performance of oil or the like under load.

According to a fifth aspect of the present invention, with respect to a hygienic thin-leaf paper, at least one from among an area ratio of tops of the first linear embossed protrusions to the first sheet; and an area ratio of tops of the second linear embossed protrusions to the second sheet is between 0.5 and 10%.

Here, an area ratio of tops of linear embossed protrusions to a given sheet refers to a percentage of top areas of linear embossed protrusions relative to a given sheet. According to the fifth aspect, with an area ratio of tops of linear embossed protrusions to a given sheet being in such a range, diffusivity of oil or the like can be improved, as well as maintaining an absorption performance of oil or the like under load.

According to a sixth aspect of the present invention, with respect to a hygienic thin-leaf paper, at least one from among an area ratio of tops of the first linear embossed protrusions to tops of the first embossed protrusions; and an area ratio of tops of the second linear embossed protrusions to tops of the second embossed protrusions is between 10 and 40%.

Here, an area ratio of tops of linear embossed protrusions to tops of embossed protrusions refers to a percentage of top areas of linear embossed protrusions relative to top areas (the total sum of top areas of multiple first dotted embossed protrusions and top areas of multiple first linear embossed protrusions) of embossed protrusions. According to the sixth aspect, with an area ratio of tops of linear embossed protrusions to tops of embossed protrusions being in such a range, diffusivity of oil or the like can be improved, as well as diffusivity of oil or the like being reliably maintained under load.

According to a seventh aspect of the present invention, with respect to a hygienic thin-leaf paper, at least one from among an area ratio of tops of the first embossed protrusions to the first sheet and an area ratio of tops of the second embossed protrusions to the second sheet is between 5 and 25%.

Here, an area ratio of tops of embossed protrusions to a given sheet refers to a percentage of top areas (the total sum of top areas of multiple first dotted embossed protrusions and top areas of multiple first linear embossed protrusions) of embossed protrusions relative to a given sheet area. According to the seventh aspect, with an area ratio of tops of embossed protrusions to a given sheet being in such a range, diffusivity of oil or the like can be improved, as well as diffusivity of oil or the like being reliably maintained under load.

According to an eighth aspect of the present invention, with respect to a hygienic thin-leaf paper, for either or both of the first linear embossed protrusions and the second linear embossed protrusions, each linear embossed protrusion has a top width of 0.3 to 1.5 mm and a top length of 4.0 to 50.0 mm. According to the eighth aspect, with dimensions of each linear embossed protrusion being in such a range, diffusivity of oil or the like can be reliably improved, as well as diffusivity of oil or the like being reliably maintained under load.

According to a ninth aspect of the present invention, with respect to a hygienic thin-leaf paper, a first embossed pattern of the first embossed protrusions each of which faces the second sheet is symmetric with respect to a second embossed pattern of the second embossed protrusions each of which faces the first sheet. Here, symmetry means that a first embossed pattern and a second embossed pattern match in a case where, by any reference, the second embossed pattern or the first embossed pattern is moved with respect to the first embossed pattern and a second embossed pattern.

According to the ninth aspect, because embossed protrusions that have such symmetry are provided in each sheet, embossed protrusions can be regularly arranged. Thereby, according to the ninth aspect, diffusivity of oil or the like are reliably improved, as well as being able to create a design.

According to a tenth aspect of the present invention, with respect to a hygienic thin-leaf paper, the first embossed pattern and the second embossed pattern are line-symmetric. Here, line symmetry means that a first embossed pattern and a second embossed pattern match in a case where, by using an axis expressed by a hypothetical line, the second embossed pattern or the first embossed pattern is inverted with respect to the first embossed pattern and a second embossed pattern.

According to the tenth aspect, because embossed protrusions that have such symmetry are provided in each sheet, regular arrangement of linear embossed protrusions can be achieved between a first sheet and a second sheet. Thereby, according to the tenth aspect, diffusivity of oil or the like are more reliably improved, as well as being able to create a design.

According to an eleventh aspect of the present invention, with respect to a hygienic thin-leaf paper, the first sheet and the second sheet are integrated to be a nested type. According to the eleventh aspect, because a first sheet and a second sheet are integrally laminated to be a nested type, an area of hygienic thin-leaf paper contacting an object to be used can be reduced. Thereby, a space in the hygienic thin-leaf paper is not easily collapsed in a case of a load being applied when used. Further, even when a non-embossed space is not formed between a first sheet and a second sheet, an absorption rate can be maintained, as well as being able to maintain an absorption performance under load. Thereby, a weight and a paper thickness can be reduced, and thus a thickness of the hygienic thin-leaf paper can be decreased.

Hereafter, embodiments of the present invention will be described in detail with reference to the drawings. Note that in the following description, for ease of understanding, the same reference numerals denote same members with respect to portions that are common to each drawing; accordingly, the explanations may be omitted. Further, in the description, a scale of each member in each drawing may differ from an actual scale.

Figure 2:
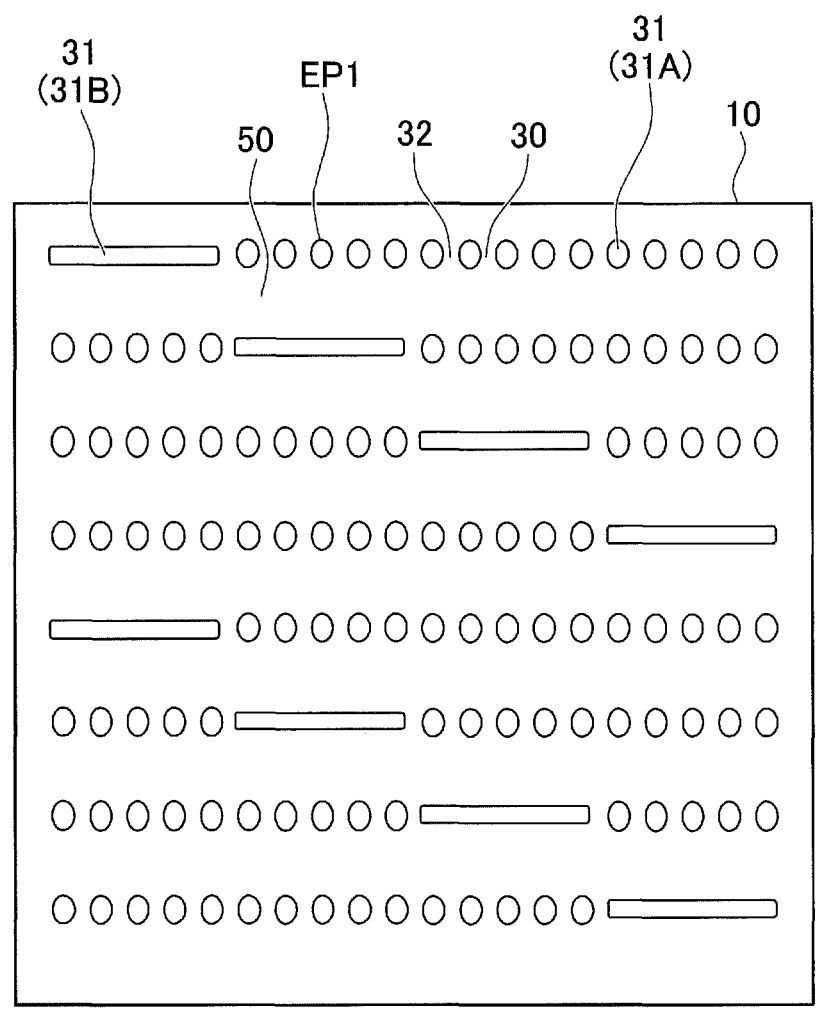
FIG. 2 is a diagram illustrating a first sheet that is included in the hygienic thin-leaf paper of FIG. 1.
Figure 3:
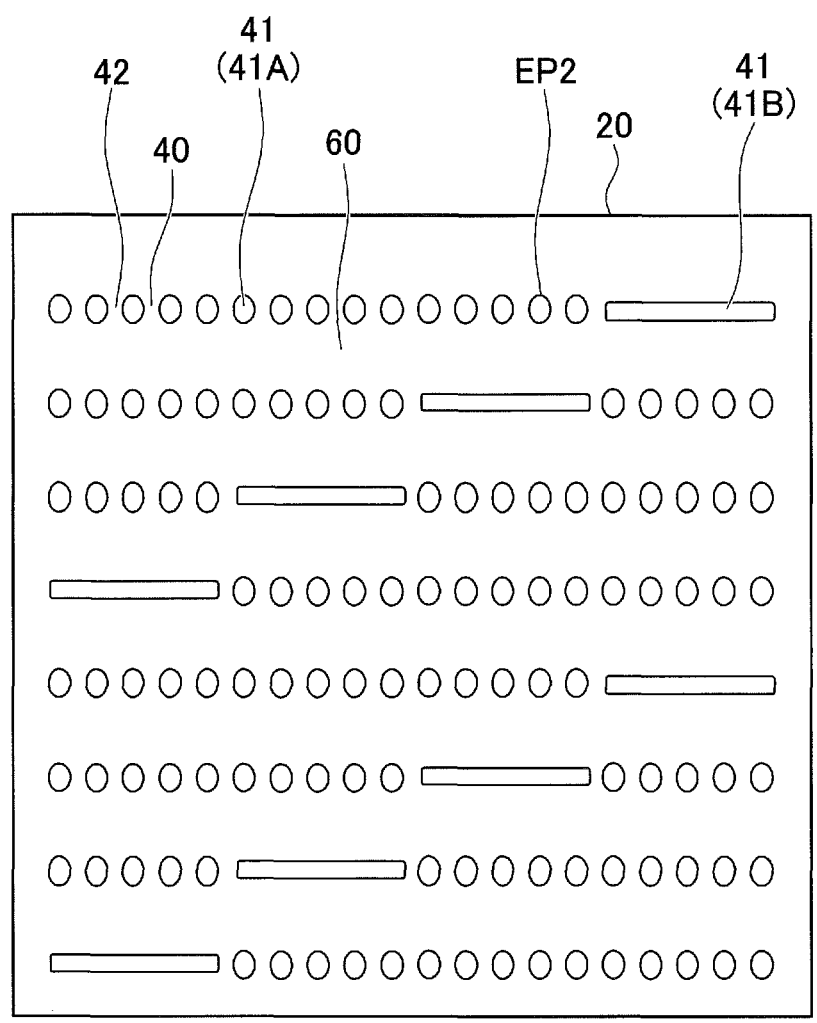
FIG. 3 is a diagram illustrating a second sheet that is included in the hygienic thin-leaf paper of FIG. 1.
Figure 4:
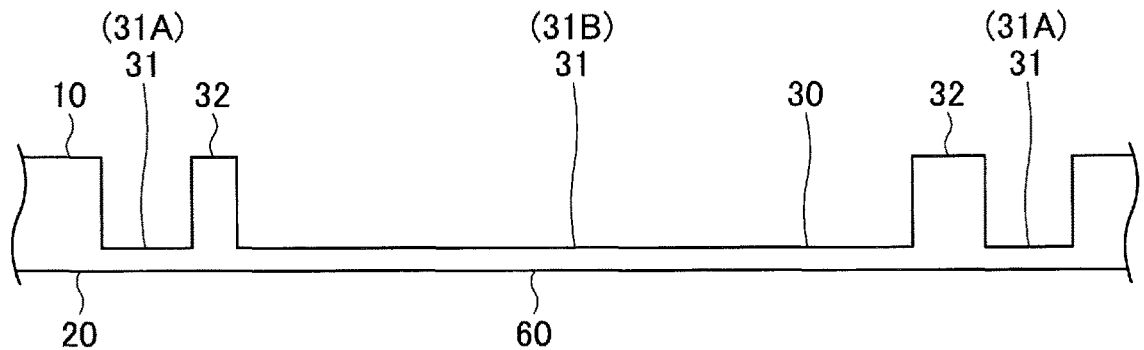
FIG. 4 (A) is a cross-sectional view taken along the line 4A of FIG. 1.
Figure 4:
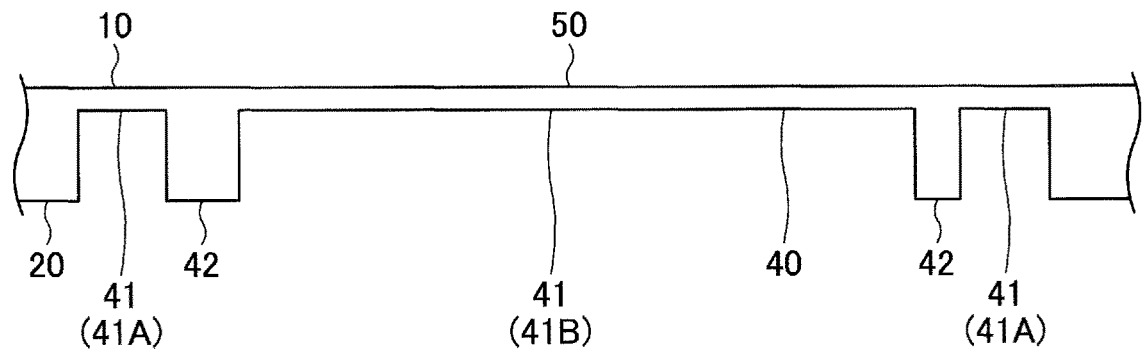
Figure 4:
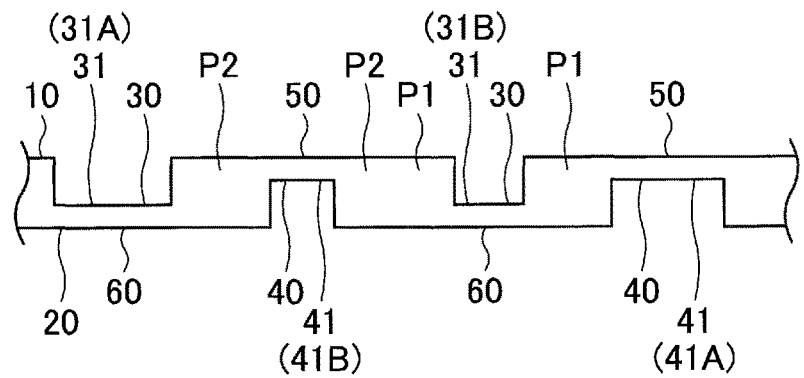

FIG. 1 is a diagram schematically illustrating hygienic thin-leaf paper according to an embodiment of the present invention. FIG. 2 is a diagram illustrating a first sheet that is included in the hygienic thin-leaf paper of FIG. 1. FIG. 3 is a diagram illustrating a second sheet that is included in the hygienic thin-leaf paper of FIG. 1. FIG. 4 (A) is a cross-sectional view taken along the line 4A of FIG. 1. FIG. 4 (B) is a cross-sectional view taken along the line 4B of FIG. 1. FIG. 4 (C) is a cross-sectional view taken along the line 4C of FIG. 1.

In FIG. 1, the reference numeral 100 denotes a paper towel that is an example of hygienic thin-leaf paper according to the present invention. A manner of the paper towel 100 is not particularly restricted. A roll type in which a band of paper towel having perforations for allowing divisions, at appropriate intervals is wrapped around a paper core; or a stacked type in which sheet-fed paper towels each of which is folded can be used, the stacked type being called pick-up, pop-up, or the like, can be used.

The hygienic thin-leaf paper according to the present invention is not limited to a paper towel, and also includes tissue paper; or hygienic thin-leaf paper of the dry type or wet type in which water or a chemical solution is impregnated. The hygienic thin-leaf paper may be used for both of domestic and commercial purposes.

As illustrated in FIG. 1, a paper towel 100 includes crepe paper 10 and crepe paper 20. The crepe paper 10 and the crepe paper 20 are examples of a first sheet and a second sheet that constitute hygienic thin-leaf paper according to the present invention. Each of the crepe paper 10 and the crepe paper 20 is paper in which a fine wrinkle on a sheet front is formed when a blade called a doctor blade touches at an outlet of a dryer of a paper machine in a papermaking process of a sheet.

The crepe paper 10 is made of base paper of which the main raw material is pulp. A pulp composition can include a known composition used in a paper towel. For example, a percentage of pulp may be 50% by mass or more, preferably 90% by mass or more, and more preferably 100% by mass. The crepe paper 20 can be made of base paper that is the same as that of the crepe paper 10.

A pulp composition of each of the crepe paper 10 and the crepe paper 20 is not particularly restricted. For example, the pulp composition can be set with a suitable ratio of coniferous pulp such as NBKP (coniferous kraft pulp) or NUKP (coniferous unbleached pulp); and hardwood pulp such as LBKP (hardwood kraft pulp) or LUKP (hardwood unbleached pulp). In particular, it is preferred that coniferous pulp be defined by a pulp composition having a higher composition than hardwood pulp. Preferably, a ratio of coniferous pulp to hardwood pulp is between 50:50 and 80:20.

For each of the crepe paper 10 and the crepe paper 20, base paper with a basis weight of 15 to 30 $g/m^2$ per ply (or ream weight) is used in accordance with JIS P 8124 (1998). When the basis weight of each of the crepe paper 10 and the crepe paper 20 is adjusted to be in such a range, in a case of a liquid such as water or oil contacting with a sheet face, liquid diffusivity are sufficiently achieved, and thus a particularly high absorption performance is provided. Additionally, a basis weight in such a range allows for flexibility and compliance when used as a paper towel.

As illustrated in FIGS. 1 and 2, the crepe paper 10 includes embossed regions 30 and non-embossed regions 50. Each embossed region 30 includes one or more embossed protrusions 31 and one or more non-embossed protrusions 32. On the other hand, each non-embossed region 50 does not include an embossed protrusion 31 and a non-embossed protrusion 32. Note that the embossed region 30, the embossed protrusion 31, the non-embossed protrusion 32, and the non-embossed region 50 are respective examples of a first embossed region, a first embossed protrusion, a first non-embossed protrusion, and a first non-embossed region of the hygienic thin-leaf paper according to the present invention.

Each embossed region 30 of the crepe paper 10 is an area where the crepe paper 10 is embossed. Specifically, for the crepe paper 10, multiple embossed protrusions 31 and multiple embossed recesses corresponding to the embossed protrusions 31 are respectively formed on a front and a back of the sheet of the crepe paper 10. With an embossing method of a known steel rubber type being used, the embossed protrusions 31 are formed on one face of the crepe paper 10, by pressing a protruded emboss roll, which is not illustrated, against the crepe paper 10. The embossed recesses, each of which corresponds to a given embossed protrusion 31, are formed on another face of the crepe paper 10.

Multiple non-embossed protrusions 32 are formed in a given embossed region 30. A given non-embossed protrusion 32 refers to a portion in which a non-embossed protrusion 32 adjacent to a plurality of embossed protrusions 31 is not formed (see FIGS. 1 and 2).

The embossed protrusions 31 of the crepe paper 10 further include multiple embossed dots 31A and multiple embossed lines 31B, as illustrated in FIGS. 1 and 2. Note that the embossed dot 31A and the embossed line 31B are respective examples of a first dotted embossed protrusion and a first linear embossed protrusion of the hygienic thin-leaf paper according to the present invention.

Each embossed dot 31A is formed by a dotted or point typed embossed portion. A top of a given embossed dot 31A (or an opening of a given embossed dot 31A) has an elliptical shape, in a plan view. Note that a top shape of the embossed dot 31A is not limited to an elliptical shape, and may have other shapes such as a square shape, a triangle shape, a circle shape, and the like.

A side of each embossed dot 31A is tapered, which is not illustrated, toward a top of a given embossed dot 31A from a face on which the embossed dot 31A of the crepe paper 10 is formed. With being tapered, each dotted emboss 31A is not easily collapsed in a thickness direction of the paper towel 100.

Each embossed line 31B is formed by a linear or line typed embossed portion. A top of a given embossed line 31B (or an opening of a given embossed line 31B) has a linearly elongated rectangular shape, in a plan view. Note that a top shape of the embossed line 31B is not limited to the linear shape, and may be partially or wholly curved.

A side of each embossed line 31B is tapered, which is not illustrated, toward a top of a given embossed line 31B from a face on which the embossed line 31B of the crepe paper 10 is formed. With being tapered, each embossed line 31B is not easily collapsed in a thickness direction of the paper towel 100.

As illustrated in FIGS. 1 and 3, the crepe paper 20 includes embossed regions 40 and non-embossed regions 60. Each embossed region 40 includes one or more embossed protrusions 41 and one or more non-embossed protrusions 42. On the other hand, each non-embossed region 60 does not include an embossed protrusion 41 and a non-embossed protrusion 42. Note that the embossed region 40, the embossed protrusion 41, the non-embossed protrusion 42, and the non-embossed region 60 are respective examples of a second embossed region, a second embossed protrusion, a second non-embossed protrusion, and a second non-embossed region of the hygienic thin-leaf paper according to the present invention.

Each embossed region 40 of the crepe paper 20 is an area where the crepe paper 20 is embossed. Specifically, for the crepe paper 20, multiple embossed protrusions 41 and multiple embossed recesses corresponding to the embossed protrusions 41 are respectively formed on a front and back of the sheet of the crepe paper 20. As a similar manner to the embossed protrusions 31, the embossed protrusions 41 are formed on one face of the crepe paper 20, by pressing a protruded emboss roll, which is not illustrated, against the crepe paper 20. The embossed recesses, each of which corresponds to a given embossed protrusion 41, are formed on another face of the crepe paper 20.

Multiple non-embossed protrusions 42 are formed in a given embossed region 40. A given non-embossed protrusion 42 refers to a portion in which a non-embossed protrusion 42 adjacent to a plurality of embossed protrusions 41 is not formed (see FIGS. 1 and 3).

The embossed protrusions 41 of the crepe paper 20 further include multiple embossed dots 41A and multiple embossed lines 41B, as illustrated in FIGS. 1 and 3. Note that the embossed dot 41A and the embossed line 41B are respective examples of a second dotted embossed protrusion and a second linear embossed protrusion of the hygienic thin-leaf paper according to the present invention.

Each embossed dot 41A is formed by a dotted or point typed embossed portion. A top of a given embossed dot 41A (or an opening of a given embossed dot 41A) has an elliptical shape, in a plan view. Note that a top shape of the embossed dot 41A is not limited to an elliptical shape, and may have other shapes such as a square shape, a triangle shape, a circle shape, and the like.

A side of each embossed dot 41A is tapered, which is not illustrated, toward a top of a given embossed dot 41A from a face on which the embossed dot 41A of the crepe paper 20 is formed. With being tapered, each embossed dot 41A is not easily collapsed in a thickness direction of the paper towel 100.

Each embossed line 41B is formed by a linear or line typed embossed portion. A top of a given embossed line 41B (or an opening of a given embossed line 41B) has a linearly elongated rectangular shape, in a plan view. Note that a top shape of the embossed line 41B is not limited to the linear shape, and may be partially or wholly curved.

A side of each embossed line 41B is tapered, which is not illustrated, toward a top of a given embossed line 41B from a face on which the embossed line 41B of the crepe paper 20 is formed. With being tapered, each embossed line 41B is not easily collapsed in a thickness direction of the paper towel 100.

In the present embodiment, as illustrated in FIGS. 1 to 4, the paper towel 100 is formed by the crepe paper 10 and the crepe paper 20 being integrally laminated. Specifically, the paper towel 100 has a laminated structure of the crepe paper 10 and the crepe paper 20 being laminated. A manner of such a laminated structure is not particularly restricted, and can be taken as a tip-to-tip type laminated structure, a nested type laminated structure, or the like, which is employed in a laminated structure of a conventional paper towel.

In the present embodiment, in a manner such that the crepe paper 10 and the crepe paper 20 are laminated, each embossed protrusion 31 of the crepe paper 10 is disposed to face a given non-embossed region 60 (a region where both of an embossed protrusion 41 and a non-embossed protrusion 42 are not provided) of the crepe paper 20. On the other hand, each embossed protrusion 41 of the crepe paper 20 is disposed to face a given non-embossed region 50 (a region where both of an embossed protrusion 31 and a non-embossed protrusion 32 are not provided) of the crepe paper 10 (see FIG. 4).

A top of each embossed protrusion 41 of the crepe paper 20 is bonded to a given non-embossed region 50 of the crepe paper 10, by an adhesive that is not illustrated. By bonding a top of each embossed protrusion 41 of the crepe paper 20 to a given non-embossed region 50 of the crepe paper 10, a portion of two sheets of the crepe paper 10 and the crepe paper 20 being bonded can be arranged on one crepe paper (crepe paper 10) side, in a balanced manner. Thereby, deterioration of an absorption performance due to an adhesive can be reduced.

Note that as the adhesive, a known adhesive employed in a paper towel having a laminated structure can be used. Base components of such an adhesive include, for example, polyvinyl alcohol, starch, modified starch, carboxymethyl-cellulose, and the like.

Instead of bonding a top of each embossed protrusion 41 of the crepe paper 20 to a given non-embossed region 50 of the crepe paper 10, a top of each embossed protrusion 31 of the crepe paper 10 may be bonded to a given non-embossed region 60 of the crepe paper 20. Alternatively, a top of each embossed protrusion 31 of the crepe paper 10 is bonded to a given non-embossed region 60 of the crepe paper 20 and a top of each embossed protrusion 41 of the crepe paper 20 may be bonded to a given non-embossed region 50 of the crepe paper 10.

In the present embodiment, some embossed protrusions 31 include multiple embossed dots 31A, and some embossed protrusions 41 include multiple embossed dots 41A (see FIGS. 1 to 4). Thereby, these embossed dots 31A and 41A are disposed between the crepe paper 10 and the crepe paper 20, so that these embossed dots can absorb moisture or oil (hereinafter referred to as oil or the like). Further, oil or the like absorbed between the crepe paper 10 and the crepe paper 20 can be retained.

In the present embodiment, as illustrated in FIGS. 1 to 4, each non-embossed region 50 of the crepe paper 10 faces a given embossed line 41B of the crepe paper 20, and each non-embossed region 60 of the crepe paper 20 faces a given embossed line 31B of the crepe paper 10. Thereby, in the present embodiment, each non-embossed region 50 on a crepe paper 10 side is supported in a thickness direction of the paper towel 100, by a given embossed line 41B on a crepe paper 20 side. Further, each non-embossed region 60 on a crepe paper 20 side is supported in a thickness direction of the paper towel 100, by a given embossed line 31B on a crepe paper 10 side.

In the present embodiment, with such a configuration being taken, each non-embossed region 50 of the crepe paper 10 does not face a given non-embossed region 60 of the crepe paper 20 (see FIGS. 1 to 4). In other words, a non-embossed space that is easily collapsed is not formed between the crepe paper 10 and the crepe paper 20. Thereby, according to the present embodiment, because a thickness direction of the paper towel 100 can be increased in strength with respect to a load, an absorption performance under load can be maintained (e.g., reductions in bleed-through or seep-through, etc. of oil or the like in the paper towel 100).

As illustrated in FIGS. 1 and 4, between the crepe paper 10 and the crepe paper 20, each passage P1 is formed along a given embossed line 31B that faces a given non-embossed region 60; and each passage P2 is formed along a given embossed line 41B that faces a given non-embossed region 50. Thereby, oil or the like can move along passages P1 and P2 formed along respective embossed lines 31B and 41B, between the crepe paper 10 and the crepe paper 20. Accordingly, in the present embodiment, diffusivity of oil or the like absorbed between the crepe paper 10 and the crepe paper 20 can be improved.

Note that with respect to hygienic thin-leaf paper such as the paper towel 100, in general, a non-embossed space exists, thereby allowing for improvements in a design. In the present embodiment, even though such a non-embossed space does not exist, the embossed lines 31B and 41B, as well as the non-embossed regions 50 and 60, can allow for a similar level of a design to a case of a non-embossed space. Thereby, in the present embodiment, a design can be created even when there is no non-embossed space between a first sheet and a second sheet (see FIG. 1).

Figure 5:
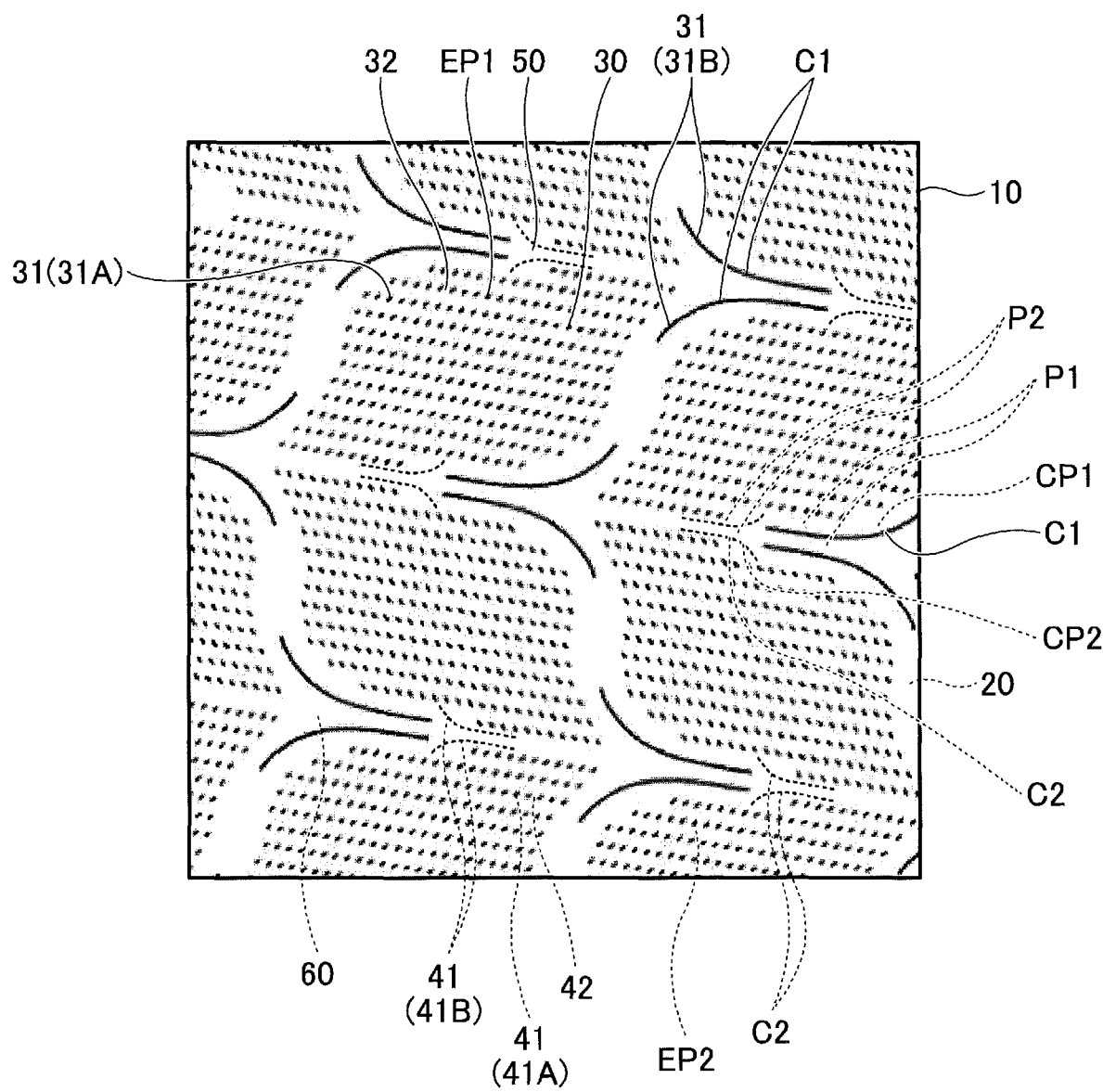
FIG. 5 is a diagram illustrating an example (first embodiment) of hygienic thin-leaf paper according to an embodiment of the present invention.
Figure 6:
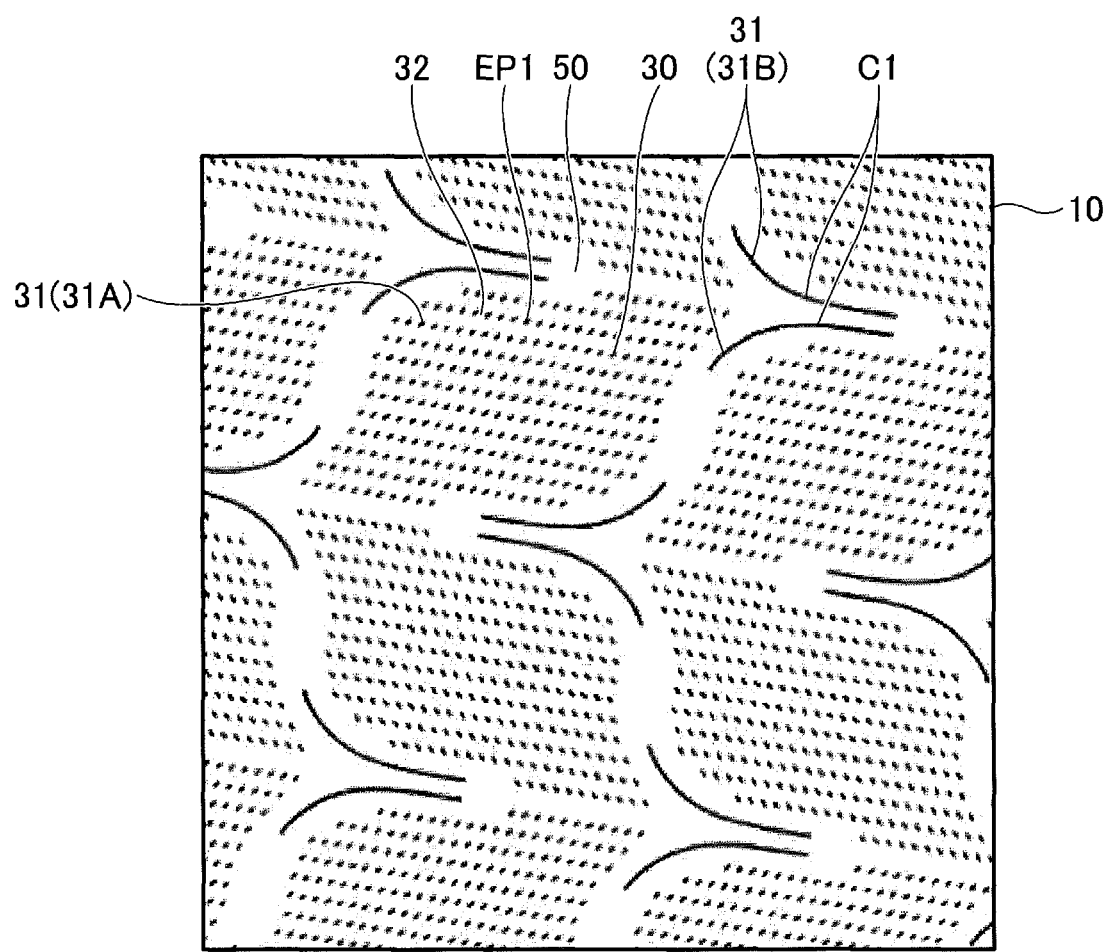
FIG. 6 is a diagram illustrating a first sheet that is included in the hygienic thin-leaf paper of FIG. 5.
Figure 7:
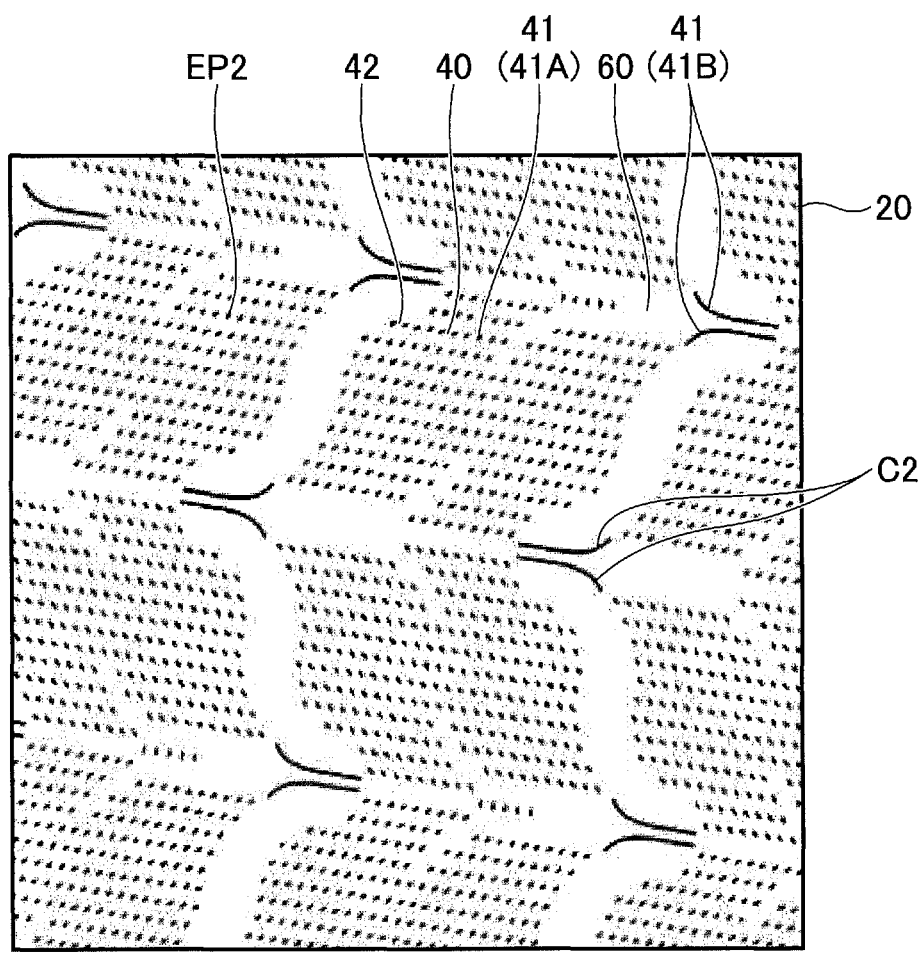
FIG. 7 is a diagram illustrating a second sheet that is included in the hygienic thin-leaf paper of FIG. 5.

FIG. 5 is a diagram illustrating an example (first embodiment) of hygienic thin-leaf paper according to an embodiment of the present invention. FIG. 6 is a diagram illustrating a first sheet that is included in the hygienic thin-leaf paper of FIG. 5. FIG. 7 is a diagram illustrating a second sheet that is included in the hygienic thin-leaf paper of FIG. 5.

In the present embodiment, either or both embossed lines 31B on a crepe paper 10 side and embossed lines 41B on a crepe paper 20 side include respective curved portions. In the present embodiment, as illustrated in FIGS. 5 and 6, each embossed line 31B on the crepe paper 10 side includes a curved portion C1; and each embossed line 41B on the crepe paper 20 side includes a curved portion C2, as illustrated in FIGS. 5 and 7.

In the present embodiment, with embossed lines 31B and 41B having such curved portions C1 and C2 being present, curved passages CP1 and CP2 are respectively formed along the embossed lines 31B and 41B, between a first sheet and a second sheet (see FIG. 5). Thereby, absorbed oil or the like moves along curved passages CP1 and CP2, and thus a direction of the oil or the like moving can be changed between the crepe paper 10 and the crepe paper 20. Accordingly, in the present embodiment, diffusivity of the oil or the like is further improved.

Additionally, in the present embodiment, either or both of embossed lines 31B and 41B include two embossed lines in parallel. In the present embodiment, as illustrated in FIGS. 5 and 6, two embossed lines 31B and 31B on a crepe paper 10 side are arranged in parallel to face one non-embossed region 60 on a crepe paper 20 side. On the other hand, as illustrated in FIGS. 5 and 7, two embossed lines 41B and 41B on a crepe paper 20 side are arranged in parallel to face one non-embossed region 50 on a crepe paper 10 side.

In the present embodiment, as illustrated in FIGS. 5 to 7, with two embossed lines 31B and 31B that are parallel on the crepe paper 10 side being present; and two embossed lines 41B and 41B that are parallel on the crepe paper 20 side being present, the number of passages P1 and P2 formed along embossed lines 31B and 41B can be increased. Thereby, an amount of oil or the like that can move between the crepe paper 10 and the crepe paper 20 is increased, so that diffusivity of the oil or the like is further improved.

Figure 8:
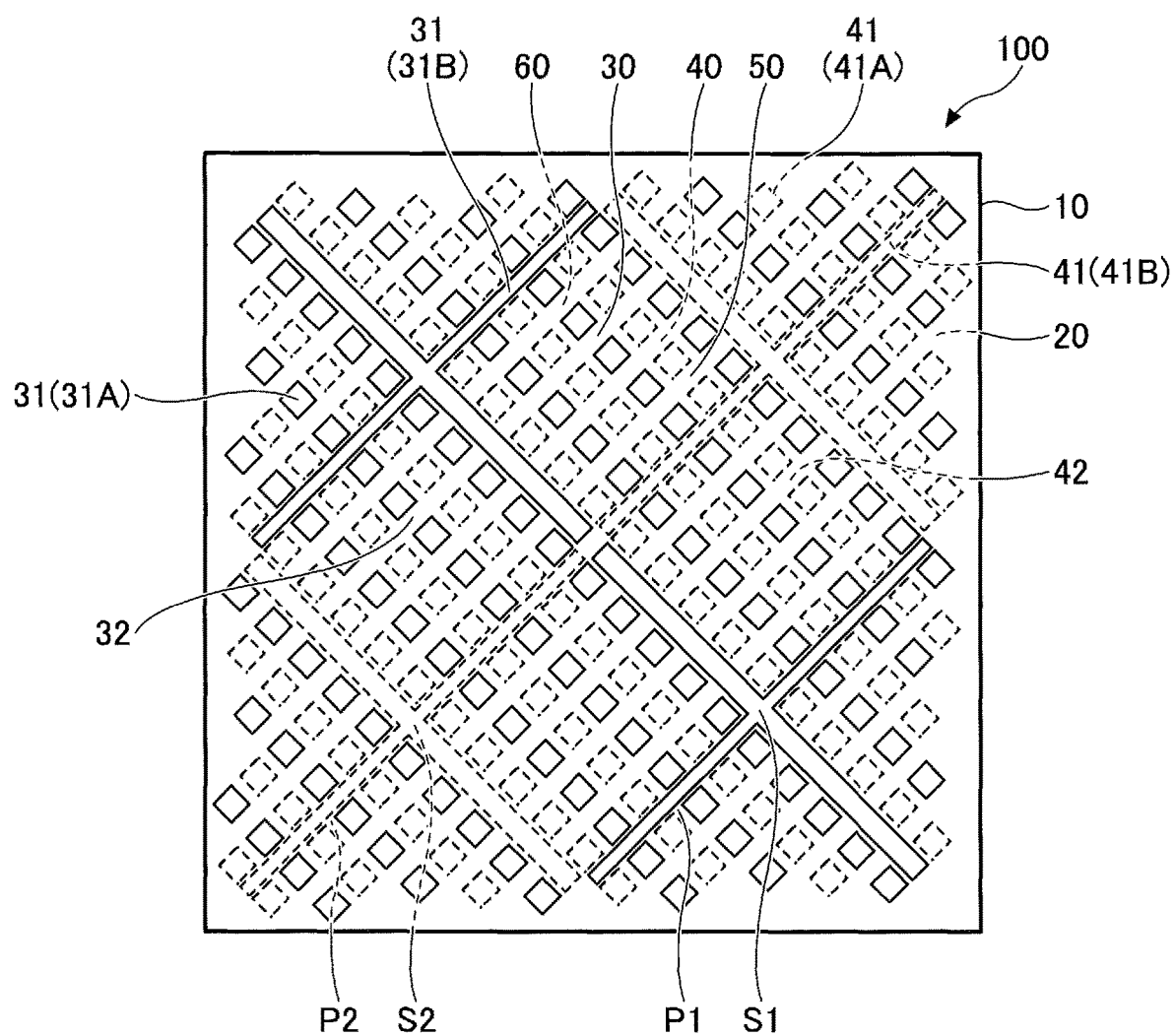
FIG. 8 is a diagram illustrating an example (second embodiment) of hygienic thin-leaf paper according to an embodiment of the present invention.
Figure 9:
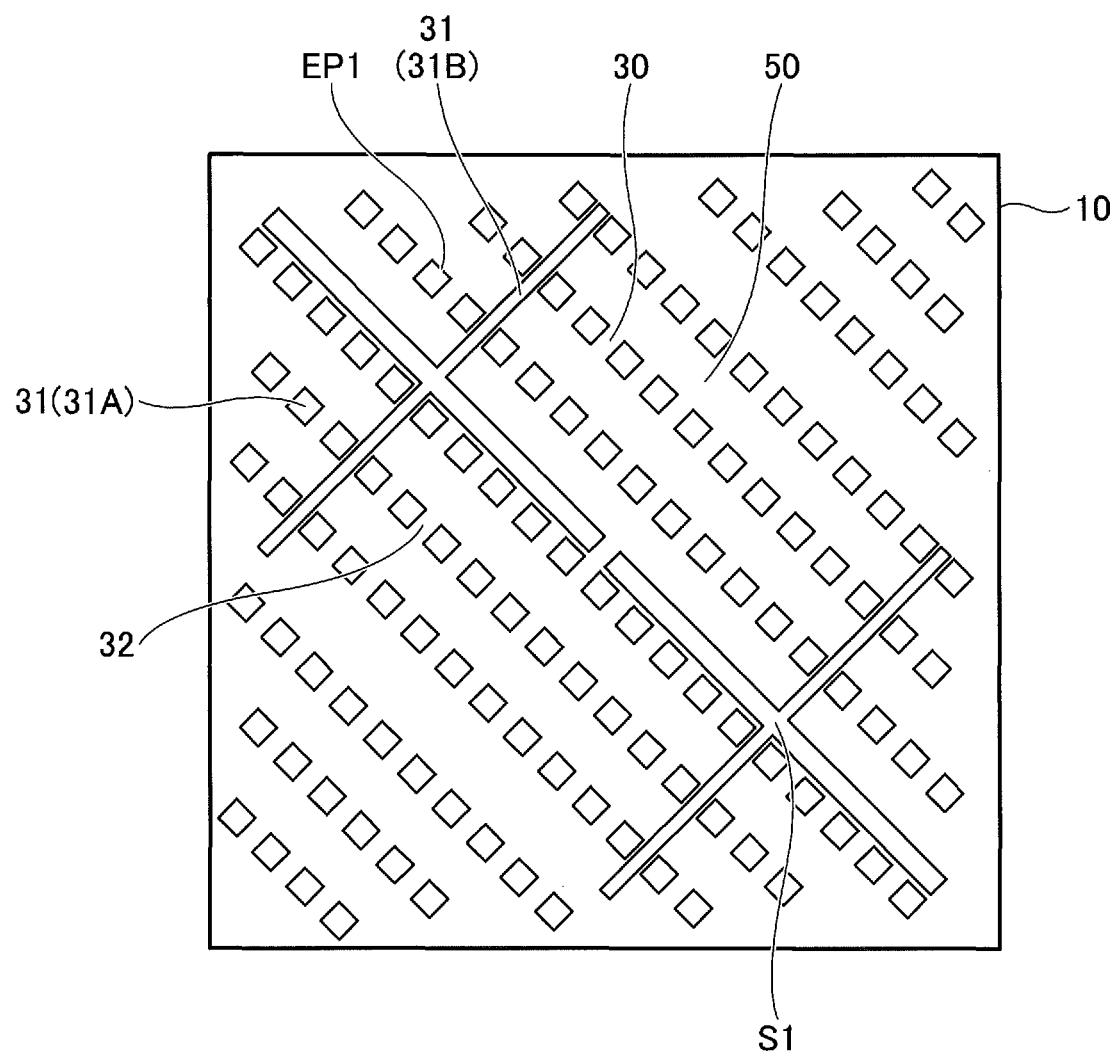
FIG. 9 is a diagram illustrating a first sheet that is included in the hygienic thin-leaf paper of FIG. 8.
Figure 10:
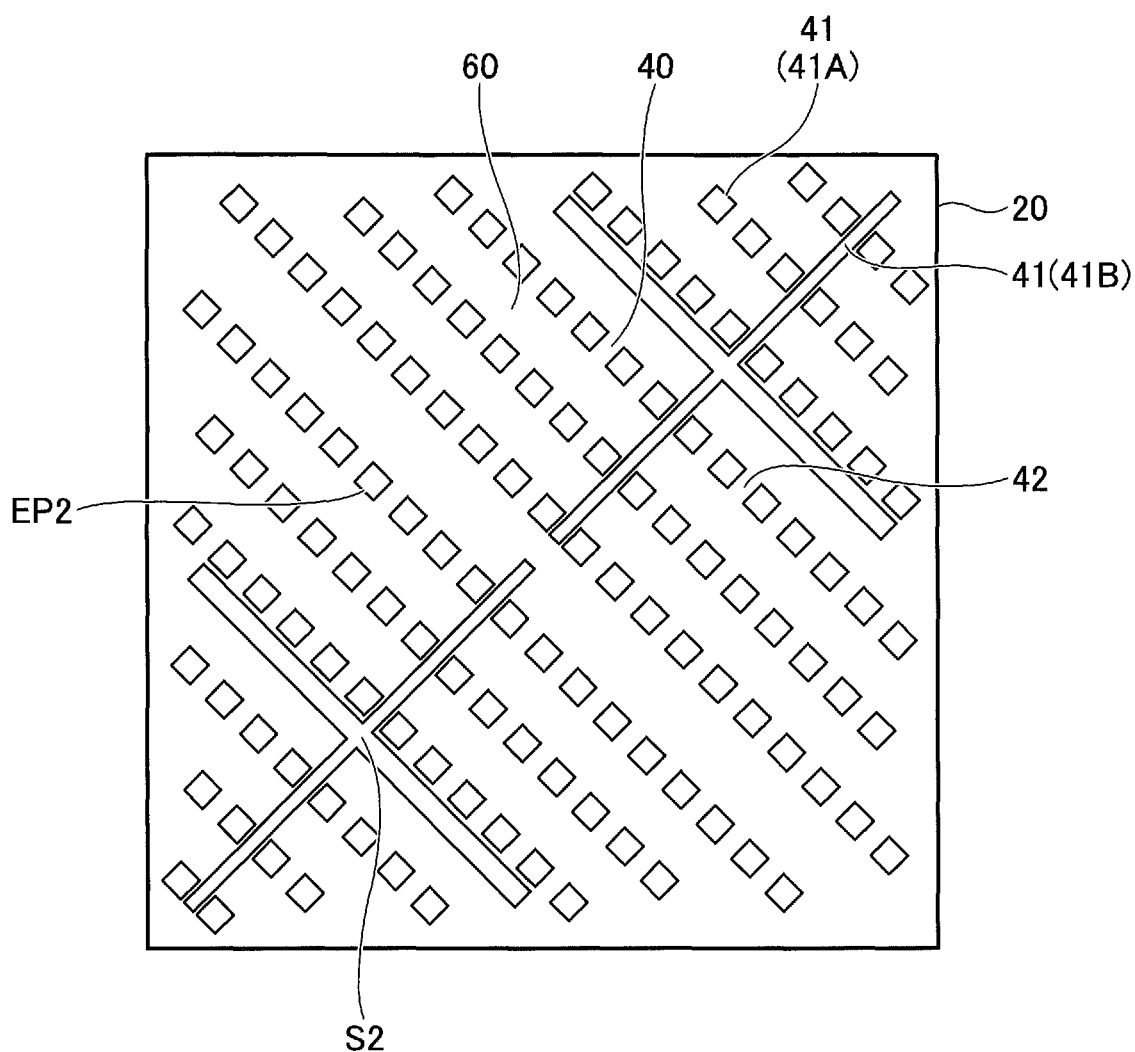
FIG. 10 is a diagram illustrating a second sheet that is included in the hygienic thin-leaf paper of FIG. 8.
Figure 11:
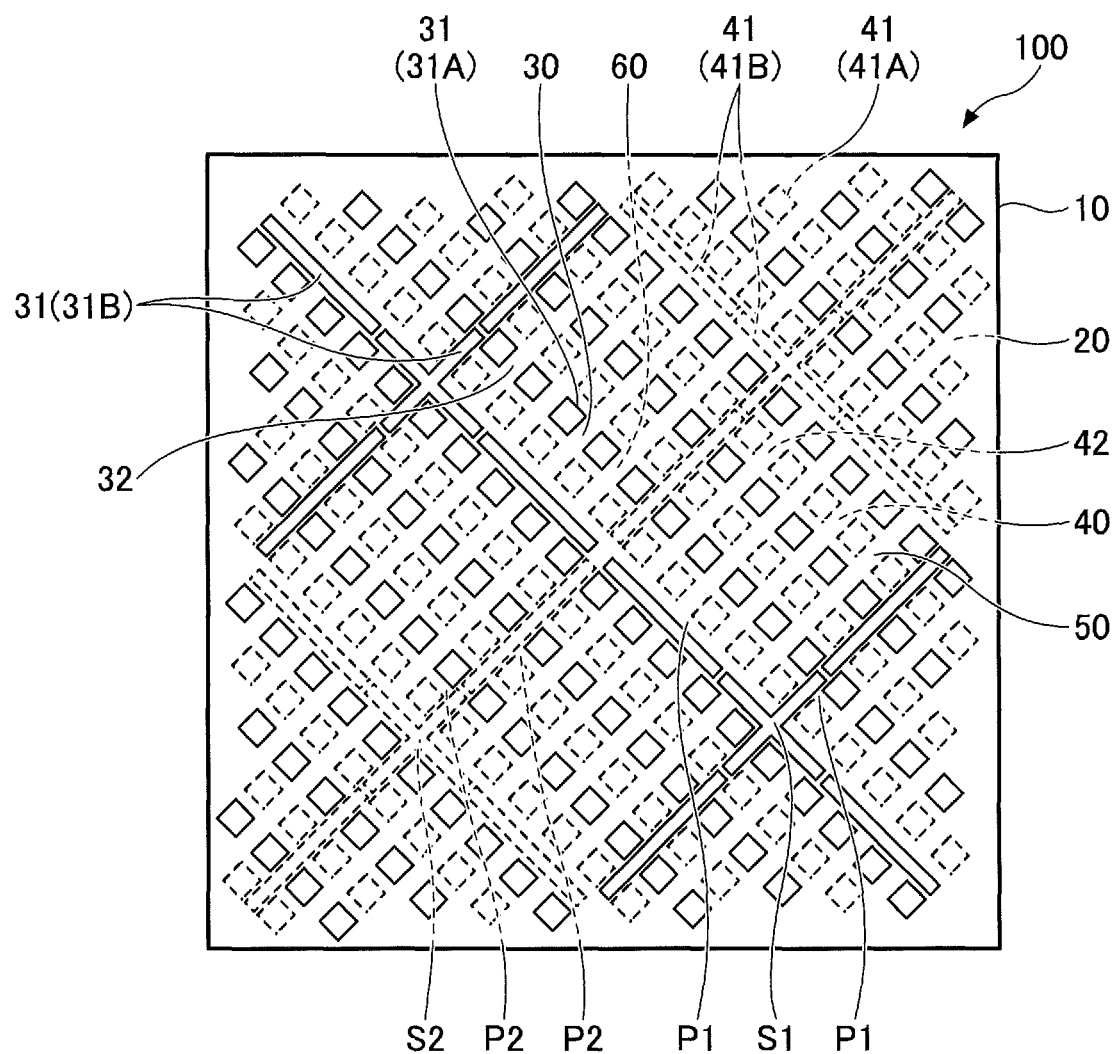
FIG. 11 is a diagram illustrating an example (third embodiment) of hygienic thin-leaf paper according to an embodiment of the present invention.
Figure 12:
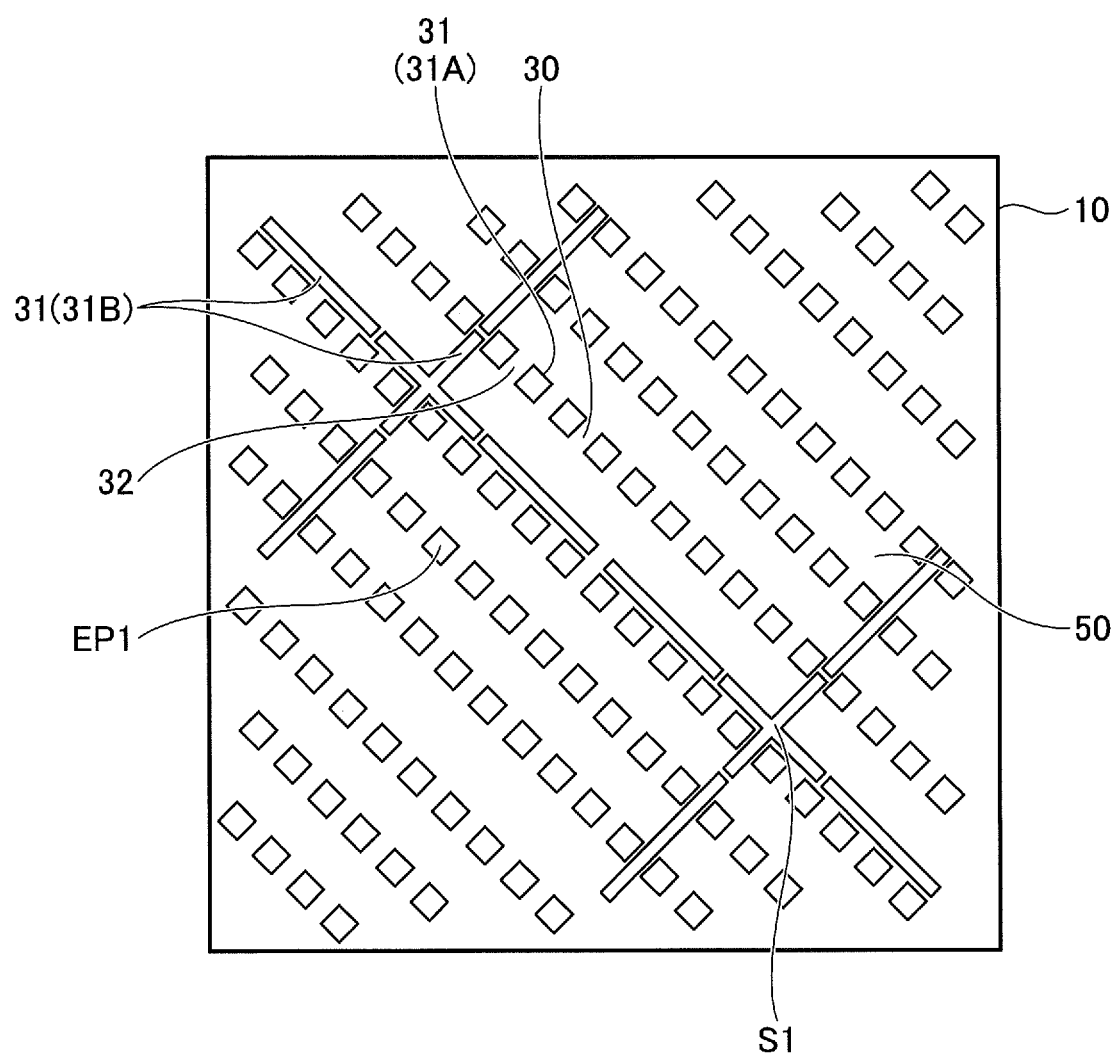
FIG. 12 is a diagram illustrating a first sheet that is included in the hygienic thin-leaf paper of FIG. 11.
Figure 13:
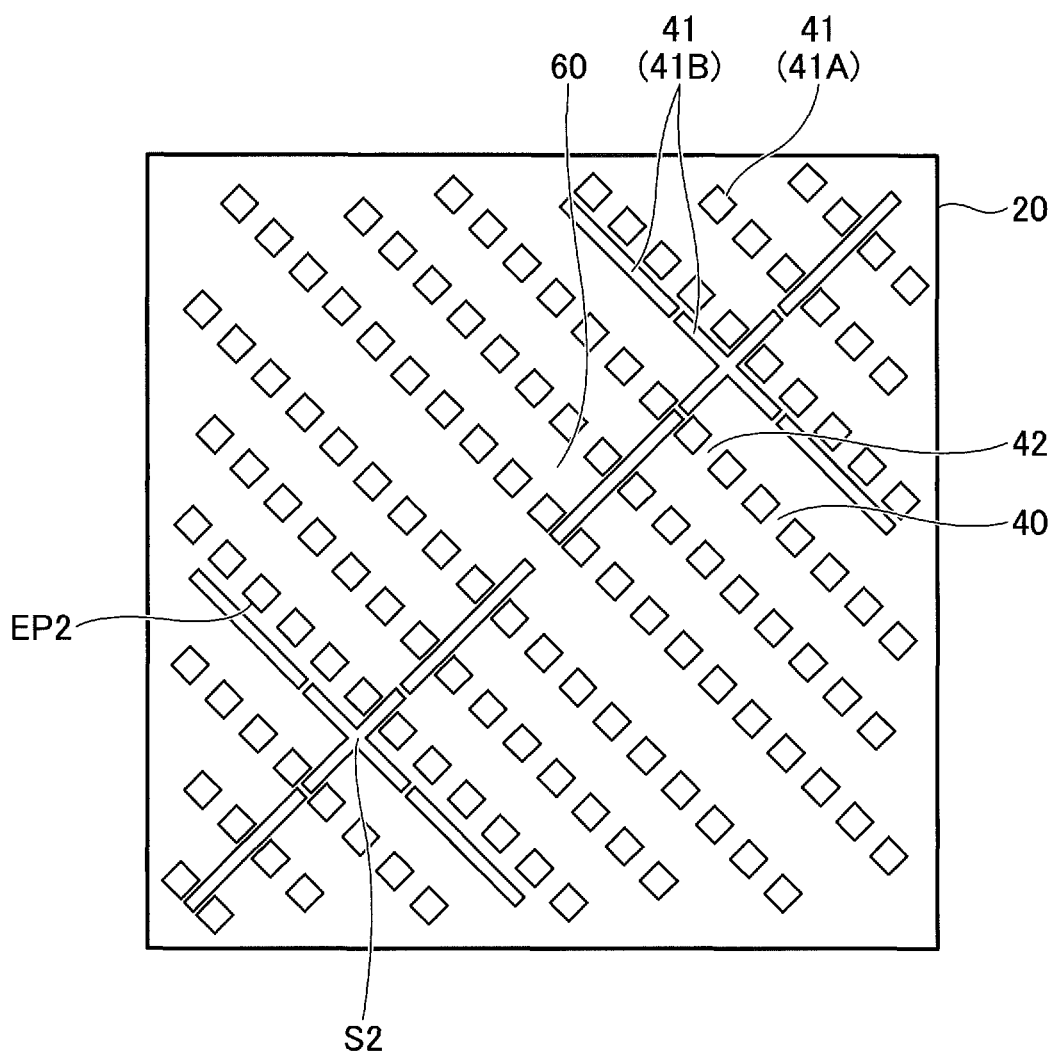
FIG. 13 is a diagram illustrating a second sheet that is included in the hygienic thin-leaf paper of FIG. 11.

FIG. 8 is a diagram illustrating an example (second embodiment) of hygienic thin-leaf paper according to an embodiment of the present invention. FIG. 9 is a diagram illustrating a first sheet that is included in the hygienic thin-leaf paper of FIG. 8. FIG. 10 is a diagram illustrating a second sheet that is included in the hygienic thin-leaf paper of FIG. 8. FIG. 11 is a diagram illustrating an example (third embodiment) of hygienic thin-leaf paper according to an embodiment of the present invention. FIG. 12 is a diagram illustrating a first sheet that is included in the hygienic thin-leaf paper of FIG. 11. FIG. 13 is a diagram illustrating a second sheet that is included in the hygienic thin-leaf paper of FIG. 11.

In these embodiments, either or both of embossed lines 31B on a crepe paper 10 side and embossed lines 41B on a crepe paper 20 side include intersecting two linear embossed protrusions. Specifically, as illustrated in FIGS. 8, 9, 11 and 12, each embossed line 31B on a crepe paper 10 side has an intersection S1; and as illustrated in FIGS. 8, 10, 11 and 13, each embossed line 41B on a crepe paper 20 side has an intersection S2.

In the present embodiments, in a thickness direction of a paper towel 100, each non-embossed region 50 on a crepe paper 10 side is supported in a thickness direction of the paper towel 100, by an embossed line 41B having an intersection S2 on a crepe paper 20 side (see FIGS. 8 to 13). On the other hand, in a thickness direction of the paper towel 100, each non-embossed region 60 on a crepe paper 20 side is supported by an embossed line 31B having an intersection S1 on a crepe paper 10 side (see FIGS. 8 to 13). Thereby, in the present embodiment, strength in a thickness direction of the paper towel 100 with respect to a load can be increased, and thus an absorption performance under load can be improved.

Additionally, in the present embodiment, with intersections S1 and S2 of such embossed lines 31B and 41B, a direction of absorbed oil or the like moving can be reliably changed as illustrated in FIGS. 8 to 13. Thereby, diffusivity of the oil or the like can be further improved.

Further, in the present embodiment, passages P1 and P2 formed between the crepe paper 10 and the crepe paper 20 are each partitioned with respective intersections S1 and S2 of the embossed lines 31B and 41B (see FIGS. 8 and 11). For this reason, because the passages P1 and P2 are not excessively long, oil or the like can be prevented from being maintained between the crepe paper 10 and the crepe paper 20. Thereby, in the present embodiment, diffusivity can be reliably improved as well as an absorption performance of oil or the like under load being maintained.

Note that in both of the second embodiment described in FIG. 8 and the third embodiment described in FIG. 11, embossed lines 31B and 41B are linearly formed in a plan view, except for intersections S1 and S2. However, as described above, some or all of embossed lines 31B and 41B may be curved in a plan view.

In the embodiments illustrated in FIGS. 1 to 13, each of an area ratio of tops of embossed lines 31B to crepe paper 10; and an area ratio of tops of embossed lines 41B to crepe paper 20 is preferably 0.5 to 10%, more preferably 0.7 to 8%, and further preferably 1 to 5%.

Note that an area ratio of tops of embossed lines 31B to crepe paper 10 refers to a percentage of top areas of embossed lines 31B relative to an area of crepe paper 10. Also, an area ratio of tops of embossed lines 41B to crepe paper 20 refers to a percentage of top areas of embossed lines 41B relative to an area of crepe paper 20.

In the embodiments, with respective area ratios of tops of embossed lines 31B and 41B to crepe paper 10 and crepe paper 20 being each in such a range, diffusivity of oil or the like can be improved as well as diffusivity being reliably maintained under load.

In the embodiments, an area ratio of tops of embossed lines 31B to tops of embossed protrusions 31 on a crepe paper 10 side; and an area ratio of tops of embossed lines 41B to tops of embossed protrusions 41 on a crepe paper 20 side is, for each, preferably 10 to 40%, more preferably 12 to 38%, and further preferably 15 to 35%.

Note that an area ratio of tops of embossed lines 31B to tops of embossed protrusions 31 refers to a percentage of top areas of embossed lines 31B relative to top areas (the total sum of top areas of multiple embossed dots 31A and top areas of multiple embossed lines 31B) of embossed protrusions 31. Further, an area ratio of tops of embossed lines 41B to tops of embossed protrusions 41 refers to a percentage of top areas of embossed lines 41B to top areas (the total sum of top areas of multiple embossed dots 41A and top areas of multiple embossed lines 41B) of embossed protrusions 41.

In the embodiments, with respective area ratios of tops of embossed lines 31B and 41B to tops of embossed protrusions 31 and 41 being each in such a range, diffusivity of oil or the like can be improved as well as diffusivity being reliably maintained under load.

Additionally, in the embodiments, each of an area ratio of tops of embossed protrusions 31 to crepe paper 10; and an area ratio of tops of embossed protrusions 41 to crepe paper 20 is preferably 5 to 25%, more preferably 7 to 20%, and further preferably 9 to 15%.

Note that an area ratio of tops of embossed protrusions 31 to crepe paper 10 refers to a percentage of top areas (the total sum of top areas of respective embossed dots 31A and top areas of respective multiple embossed lines 31B) of embossed protrusions 31 relative to an area of crepe paper 10. Further, an area ratio of tops of embossed protrusions 41 to a crepe paper 20 refers to a percentage of top areas (the total sum of top areas of respective embossed dots 41A and top areas of respective multiple embossed lines 41B) of embossed protrusions 41 to an area of crepe paper 20.

In the embodiments, when respective area ratios of embossed protrusions 31 and 41 to crepe paper 10 and crepe paper 20 are each in the above range, diffusivity of oil or the like can be improved as well as diffusivity being reliably maintained under load.

In the embodiments, with respect to either or both of embossed lines 31B on a crepe paper 10 side and embossed lines 41B on a crepe paper 20 side, a top of each of the embossed lines 31B and 41B preferably has a width of 0.3 mm to 1.5 mm, more preferably 0.4 mm to 1.2 mm, and further more preferably 0.5 mm to 1.0 mm. Further, each of the embossed lines 31B and 41B preferably has a top length of 4.0 mm to 50.0 mm, more preferably 5.0 mm to 40 mm, and further more preferably 6.0 mm to 30.0 mm.

Note that a width of an embossed line refers to a dimension in a direction perpendicular to a direction in which an embossed line extends; and a length of an embossed line refers to a dimension in a longitudinal direction in which an embossed line extends. In the embodiments, with dimensions of each of the embossed lines 31B and 41B being each in the above range, diffusivity of oil or the like can be improved as well as diffusivity being reliably maintained under load.

In the embodiments described in FIGS. 1 to 3 and FIGS. 8 to 13, an embossed pattern EP1 of embossed protrusions 31 on a crepe paper 10 side facing crepe paper 20 is symmetric with respect to a embossed pattern EP2 of embossed protrusions 41 on a crepe paper 20 side facing crepe paper 10. Note that the embossed pattern EP1 is an example of a first embossed pattern according to the present invention; and the embossed pattern EP2 is an example of a second embossed pattern according to the present invention.

In the embodiments, embossed protrusions having such symmetry are provided on respective sheets of the crepe paper 10 and crepe paper 20. Thereby, the embossed lines 31B and 41B can be arranged regularly between the crepe paper 10 and the crepe paper 20. Accordingly, a design can be created as well as diffusivity of oil or the like being reliably improved.

For example, as illustrated in FIGS. 1 to 3 and FIGS. 8 to 13, such symmetry can be taken as symmetry in which an embossed pattern EP1 of embossed protrusions 31 on a crepe paper 10 side is line-symmetric with respect to an embossed pattern EP2 of embossed protrusions 41 on a crepe paper 20 side.

In the embodiments, embossed protrusions 31 and 41 having such line symmetry are provided on respective sheets of the crepe paper 10 and the crepe paper 20, thereby ensuring a regular arrangement of the embossed lines 31B and 41B in the crepe paper 10 and the crepe paper 20. Thereby, in the embodiments, a design can be created as well as diffusivity of oil or the like being reliably improved.

In the embodiments described in FIGS. 1 to 13, crepe paper 10 and crepe paper 20 are integrated to be a nested type (see FIG. 4). With such a nested type laminated structure being used, an area of a paper towel 100 contacting an object (e.g., tableware, a fried item, etc.) is reduced. Thus, even when a load is applied during use, a space in the paper towel 100 does not easily collapse. Additionally, an absorption rate of oil or the like can be maintained without forming a non-embossed space between crepe paper 10 and crepe paper 20, as well as an absorption performance being able to be maintained under load. Accordingly, in the embodiments, a basis weight and a paper thickness can be reduced, so that a thickness of hygienic thin-leaf paper can be thereby reduced.

EXAMPLES

Hereafter, the present embodiment will be described in detail with reference to examples. The measurements and evaluations of examples and comparative examples were performed as follows.

[Raw Paper]

<Basis Weight>

A basis weight (ream weight) ($g/m^2$) of crepe paper (raw paper) of a paper towel 100 used in a test was measured. The basis weight (ream weight) is calculated according to JIS P 8124 (1998).

<Bulk>

The bulk (5-ply) (mm) of the paper towel 100 was measured. In a method of measuring bulk of a paper towel, a cut test piece of 12 cm×12 cm was sufficiently humidified under a condition set according to JIS P 8111 (1998), and then measurement was performed using a dial thickness gauge (thicknesses gauge) called "PEACOCK G TYPE" (manufactured by Ozaki MFG. Co., Ltd.), under the same condition. Specifically, in a measurement procedure, it was checked that there were no contaminants, dust, and the like between a plunger and a measurement table, and then the plunger was placed on the measurement table. Subsequently, a scale on the dial thickness gauge was adjusted to a zero point. Next, the plunger was raised and a given test piece was placed on a test table; the plunger was slowly lowered; and a gauge on the dial thickness gauge was read. In this case, the plunger was merely placed. A terminal of the plunger was made of metal, and was disposed such that a circular plane having a diameter of 30 mm perpendicularly met a paper face. A load applied in measuring such bulk is about 70 gf at 120 μm. Note that a measured value of the bulk was a mean value obtained by performing measurement 10 times.

[Oil Absorption Test]

With respect to the paper towel 100, an oil absorption test was conducted to evaluate an absorption performance under load. In the oil absorption test, as illustrated in FIG. 14, as a given test piece 200, a piece in which the paper towel 100 is cut to have the same dimension (diameter: about 82 mm) as a weight 204, was prepared. With an electronic balance (HR300 manufactured by A & D Company, Ltd., etc.) being used, each weight of a test piece 200; a plastic sheet 202 (dimensions: about 12 cm×12 cm; thickness: about 0.2 mm; weight: about 2.7 g; material: polypropylene); and a weight 204 (diameter: about 82 mm; thickness: about 10 mm; weight: about 59 g; material: acrylic) was measured, as illustrated in FIG. 14. After the measurement, a test piece 200 was placed on the plastic sheet 202 and the weight 204 was placed in the center of the test piece 200. Note that a hole H was provided through the weight 204, in a thick direction. The hole H had a diameter of about 12 mm. Then, oil 206 (salad oil at ordinary temperature) (Nisshin Salad Oil, manufactured by Nisshin OiliO Group, Ltd.) in 3.5 ml (about 3.0 g) was dropped through the hole H in the weight 204, with a pipette (FinnpipetteF2 in 0.5 to 5 ml, manufactured by Thermo Scientific) (a drop amount of oil in FIG. 14 (1)). In this case, a drop position (an embossed portion) was fixed in the center of the test piece 200, as illustrated in FIG. 14. After 2 minutes of dropping (after holding for 2 minutes), the weight 204 was removed and a weight (a return amount in FIG. 14(2)) of the oil adhering to the weight 204 was measured. Then, the plastic sheet 202 was removed and a weight (a bleed amount in FIG. 14(3)) of the plastic sheet 202 was measured. Next, a weight of the test piece 200 (an absorbed amount in FIG. 14(4)) was measured. As illustrated in FIG. 14, for each test piece 200, an amount of oil absorbed into a test piece (g); a bleed amount (g); a return amount (g); a drop amount of oil (g); an oil absorption rate of a test piece relative to a drop amount of oil (%); a bleed rate (%); a return rate (%); and a time (s) elapsed until an oil stain swells out from the weight 204 (an oil absorption rate) were measured, and were shown in Table 1. For items such as an amount of oil absorbed into a test piece (g), calculation was performed by equations listed below.

amount of oil absorbed into a test piece (g)=weight of a test piece after 2 minutes of dropping−weight of the test piece bleed amount (g)=weight of a plastic sheet after 2 minutes of dropping−weight of the plastic sheet return amount (g)=weight of a weight after 2 minutes of dropping−weight of the weight drop amount of oil (g)=amount of oil absorbed into a test piece+bleed amount of oil+return amount oil absorption rate of a test piece (%)=amount of oil absorbed into a test piece÷drop amount×100 bleed rate (%)=bleed amount÷drop amount of oil×100 return rate (%)=return amount÷drop amount of oil×100

Note that as each measured value for an amount of oil absorbed into a test piece (g); a bleed amount (g); a return amount (g); and a drop amount of oil (g), a mean value obtained by performing measurement three times was set. From these such as an amount of oil absorbed into a test piece (g); an amount (g) of oil absorbed into a test piece; a bleed amount (g); a return amount (g); and an absorption oil rate (s) were calculated.

Hereafter, examples and comparative examples will be described.

Example 1

In Example 1, a paper towel 100 as illustrated in FIGS. 1 and 5 was used. In Example 1, base paper (crepe paper 10 and crepe paper 20) having a bulk of 2.4 mm and a basis weight of 22.2 g/m² was used. A nested type laminated structure was taken. A protrusion embossed roll not illustrated had a height (protrusion height) of 1.1 mm; and an angle at which the protrusion embossed roll was tapered was 70.0 degrees. As multiple embossed protrusions 31 and 41, multiple embossed dots 31A and 41A and multiple embossed lines 31B and 41B were provided. For the embossed dots 31A and 41A, a top of each of the embossed dots 31A and 41A had an elliptical shape with a long axis (length) of 1.2 mm and a short axis (width) of 0.6 mm; the number of sheets for each of the crepe paper 10 and the crepe paper 20 was 1970 pieces/144 cm²; an area ratio of tops to each of the crepe paper 10 and the crepe paper 20 was 7.7%; and an area ratio (area rate) for tops of embossed protrusions 31 and 41 was 81.2%. On the other hand, for the embossed lines 31B and 41B, each of the embossed lines (embossed protrusions) 31B and 41B had a shape having a length of 28.7 mm and a width of 0.6 mm, the shape having a partially parallel portion and a given remaining curved portion from among curved portions C1 and C2; the number of pieces was 15 pieces/144 cm²; an area ratio of tops to each of crepe paper 10 and crepe paper 20 was 1.8%; and an area ratio (area rate) for tops of embossed protrusions 31 and 41 was 18.8% (see FIGS. 5 to 7). Additionally, an area ratio (a total area ratio) of tops of either of the embossed protrusions 31 or the embossed protrusions and 41, to given crepe paper from among the crepe paper 10 and the crepe paper 20 was 9.5%. Table 1 showed conditions and results in Example 1.

Example 2

In Example 2, a paper towel 100 illustrated in FIGS. 1 and 8 was used. In Example 2, a base paper (crepe paper 10 and crepe paper 20) having a bulk of 3.0 mm and a basis weight of 21.5 g/m² was used. An embossed pattern EP1 on a crepe paper 10 side was line-symmetrical with respect to an embossed pattern EP2 on a crepe paper 20 side. For embossed dots 31A and 41A, each top of embossed dots 31A and 41A had a square shape (quadrangular shape) with each side (length and width) of 1.2 mm; the number of pieces for each of crepe paper 10 and crepe paper 20 was 960 pieces/144 cm²; an area ratio of tops to each of the crepe paper 10 and the crepe paper 20 was 9.6%; and an area ratio (area rate) for tops of embossed protrusions 31 and 41 was 69.9%. On the other hand, for embossed lines 31B and 41B, each of the embossed lines 31B and 41B had a shape having a length of 20.0 mm and a width of 0.6 mm, the shape having a given intersection from among intersections S1 and S2; the number of pieces was 56 pieces/144 cm²; an area ratio of tops to each of the crepe paper 10 and the crepe paper 20 was 4.7%; and an area ratio (area rate) for tops of embossed protrusions 31 and 41 was 33.8% (see FIGS. 8 to 10). Additionally, an area ratio (a total area ratio) of tops of either of the embossed protrusions 31 or the embossed protrusions 41, to given crepe paper from among the crepe paper 10 and the crepe paper 20 was 14.3%. The other conditions were the same as those in Example 1. Table 1 showed conditions and results in Example 2.

Example 3

In Example 3, a paper towel 100 illustrated in FIGS. 1 and 11 was used. In Example 3, a base paper (crepe paper 10 and crepe paper 20) having a bulk of 3.1 mm and a basis weight of 21.4 g/m² was used. For embossed lines 31B and 41B, each of the embossed lines (embossed protrusions) 31B and 41B had a shape having a length of 7.0 mm and a width of 0.6 mm, the shape having one portion with a given intersection from among intersections S1 and S2 and having another portion without an intersection S1 or S2; the number of pieces was 144 pieces/144 cm²; an area ratio of tops to each of the crepe paper 10 and the crepe paper 20 was 4.2%; and an area ratio (area rate) for tops of embossed protrusions 31 and 41 was 30.4% (see FIGS. 11 to 13). Additionally, an area ratio (a total area ratio) of tops of either of the embossed protrusions 31 and the embossed protrusions 41, to given crepe paper from among the crepe papers 10 and 20 was 13.8%. The other conditions were the same as those in Example 2. Table 1 showed conditions and results in Example 3.

Comparative Example 1

Figure 15:
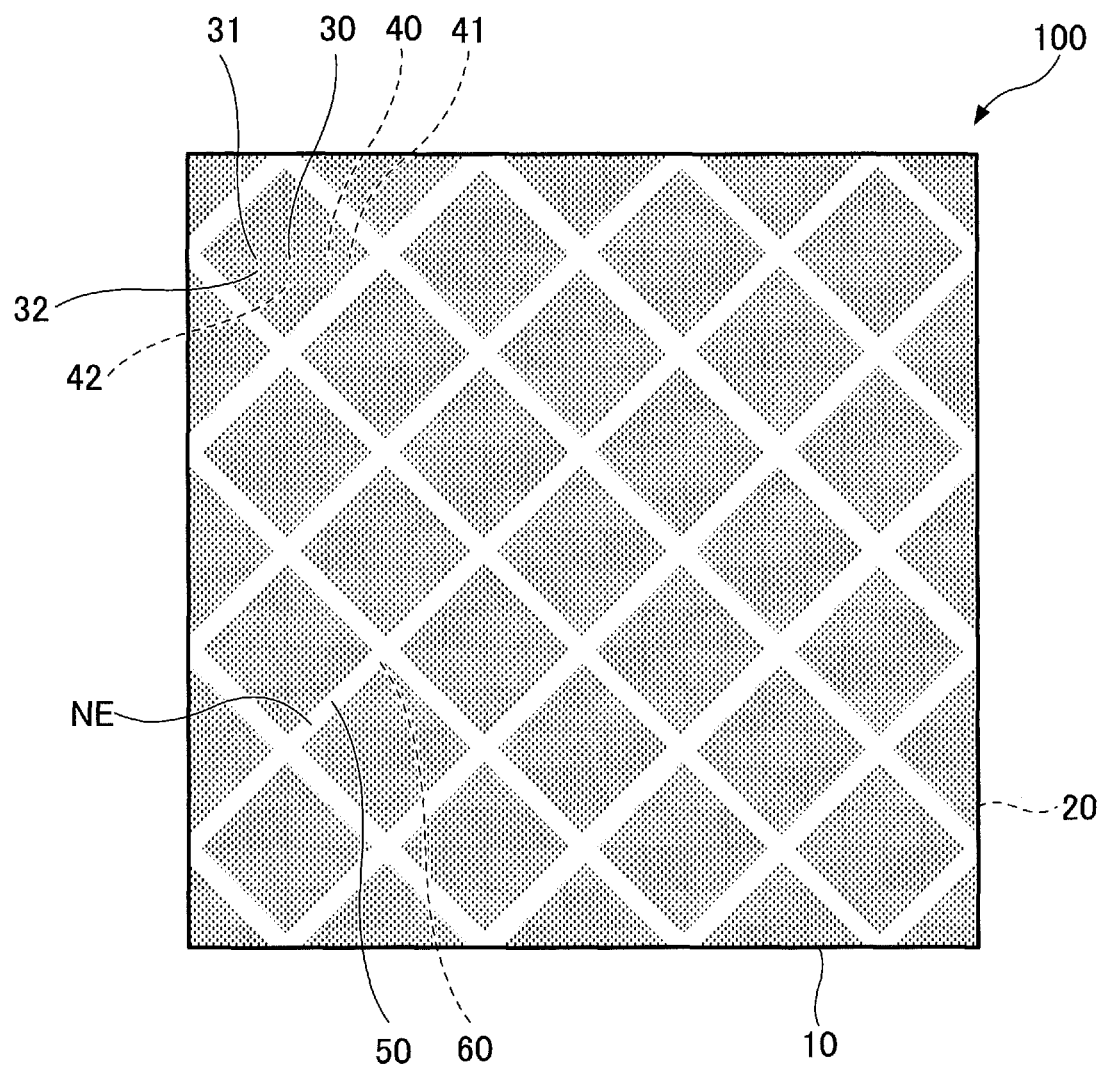
FIG. 15 is a diagram illustrating conventional hygienic thin-leaf paper (comparative example 1)
Figure 16:
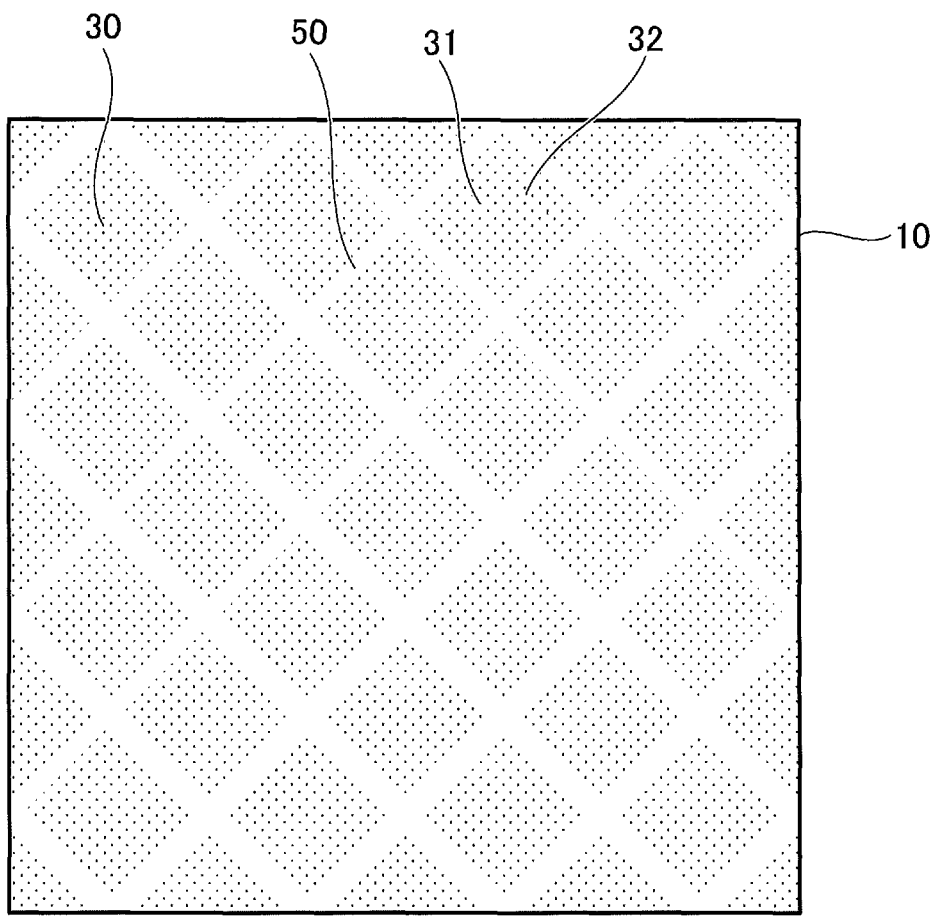
FIG. 16 is a diagram illustrating a first sheet that is included in the hygienic thin-leaf paper of FIG. 15.
Figure 17:
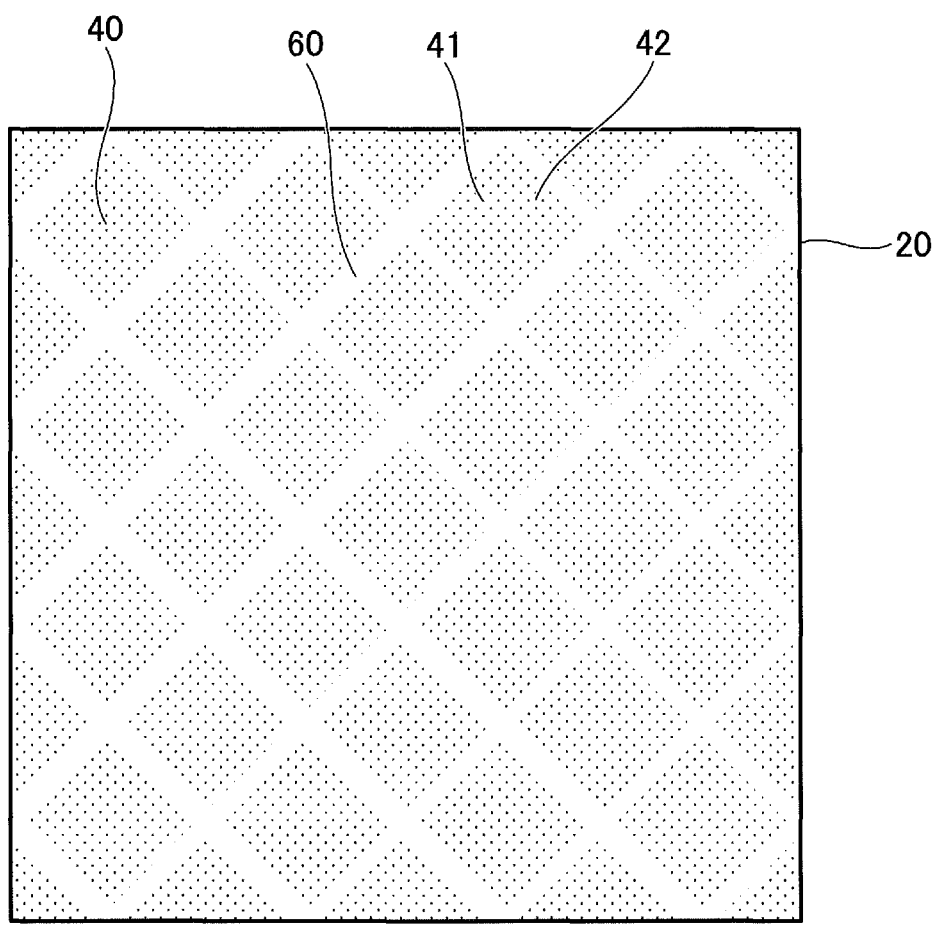
FIG. 17 is a diagram illustrating a second sheet that is included in the hygienic thin-leaf paper of FIG. 15.

In Comparative Example 1, a paper towel 100 illustrated in FIG. 15 was used. In Comparative Example 1, a base paper (crepe paper 10 and crepe paper 20) having a bulk of 2.4 mm and a basis weight of 22.1 g/m² was used. Each of non-embossed regions 50 and 60 had a lattice pattern. A tip-to-tip type laminated structure in which a given non-embossed region 50 and a given non-embossed region 60 faced each other was taken, and a non-embossed space NE was formed (see FIGS. 15 to 17). For embossed protrusions 31 and 41, each top of embossed protrusions 31 and 41 had a square shape (quadrangular shape) having each side (length and width) of 1.1 mm; and the number of pieces for each of the crepe paper 10 and the crepe paper 20 was 3250 pieces/144 cm² (see FIGS. 15 to 17). Additionally, an area ratio of tops to each of the crepe paper 10 and the crepe paper 20 was 13.7%. The other conditions were the same as those in Example 2. Table 1 showed conditions and results in Comparative Example 1.

Comparative Example 2

Figure 18:
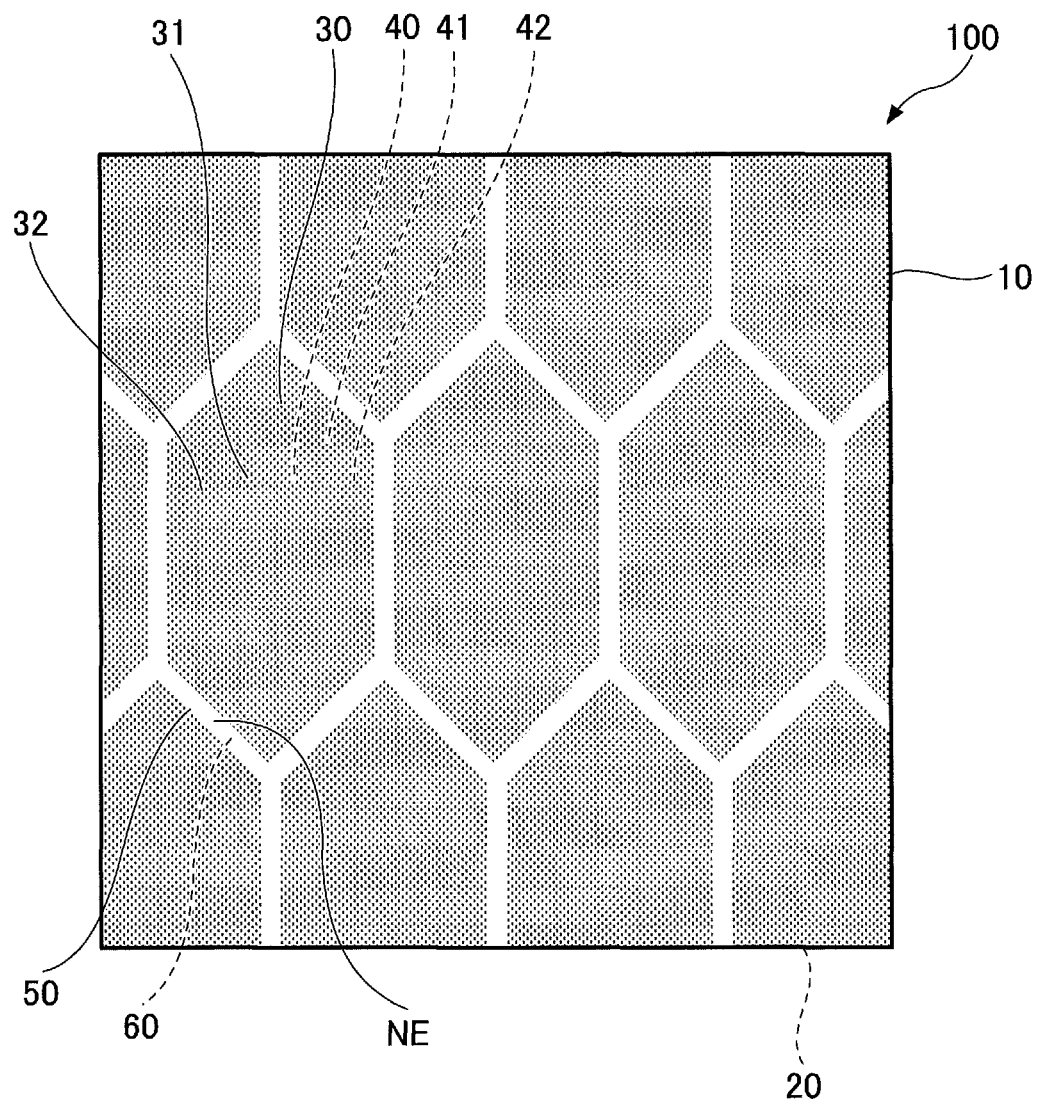
FIG. 18 is a diagram illustrating conventional hygienic thin-leaf paper (comparative example 2)
Figure 19:
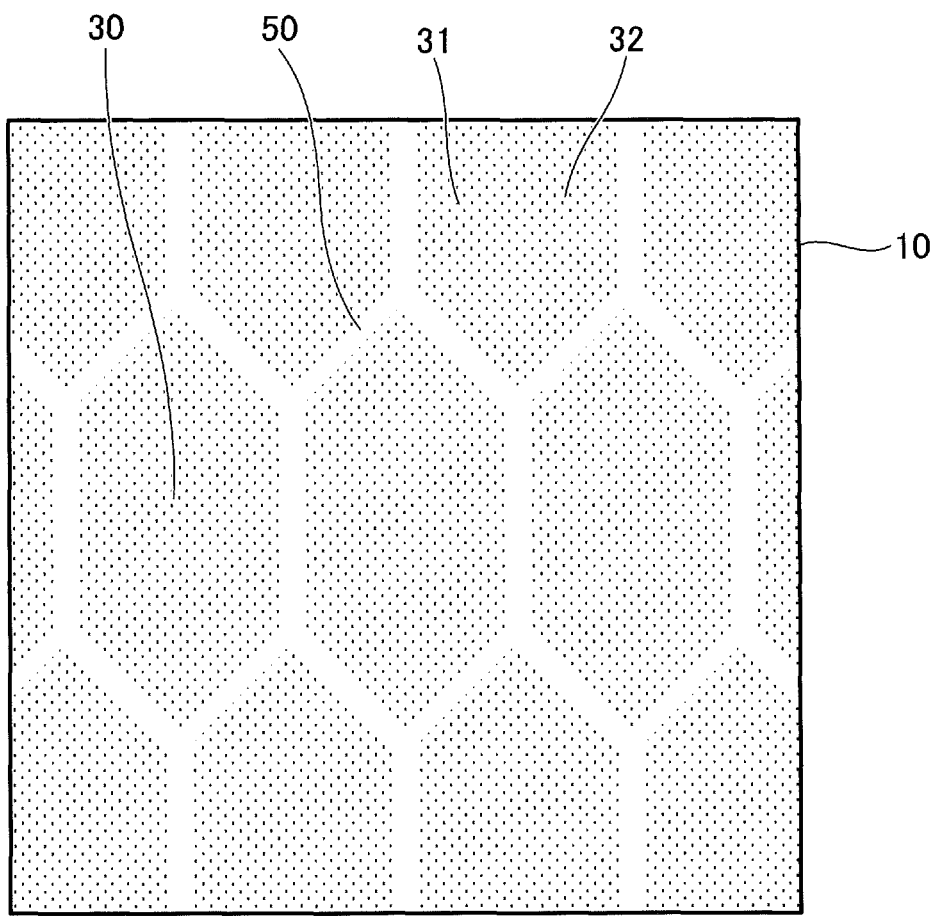
FIG. 19 is a diagram illustrating a first sheet that is included in the hygienic thin-leaf paper of FIG. 18.
Figure 20:
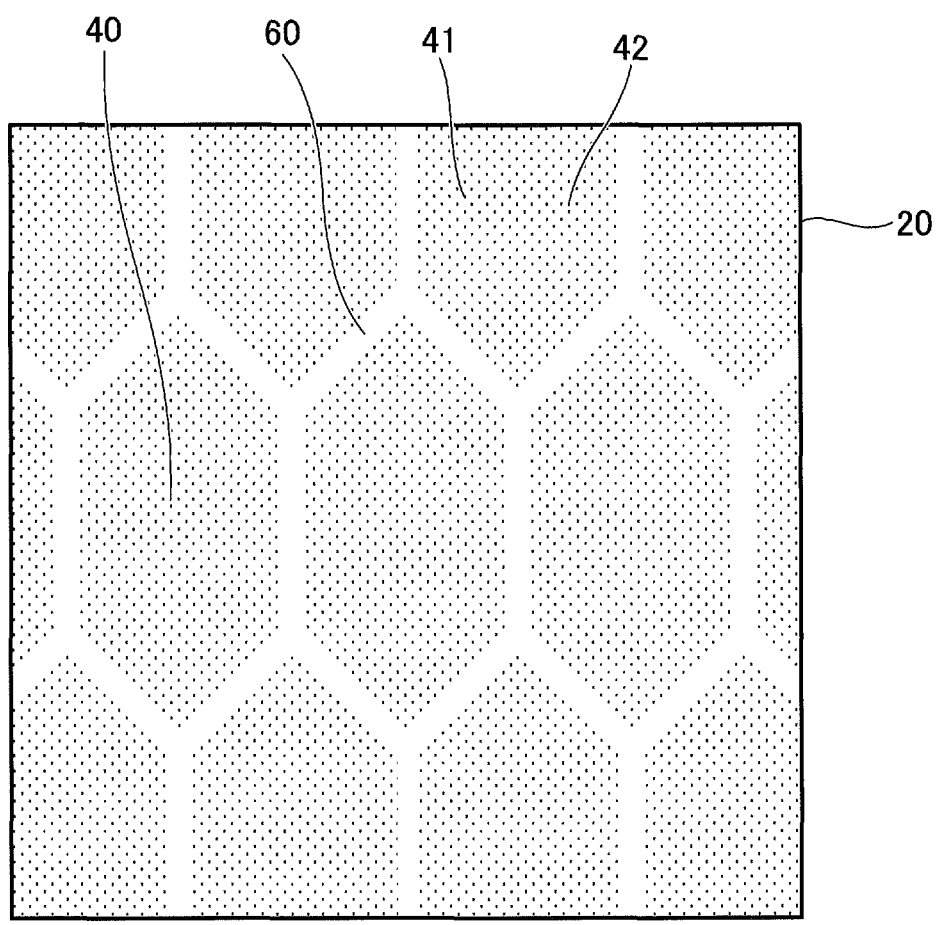
FIG. 20 is a diagram illustrating a second sheet that is included in the hygienic thin-leaf paper of FIG. 18.

In Comparative Example 2, a paper towel 100 illustrated in FIG. 18 was used. In Comparative Example 2, a base paper (crepe paper 10 and crepe paper 20) having a bulk of 3.3 mm and a basis weight of 21.7 g/m² was used. Each of non-embossed regions 50 and 60 had a honeycomb pattern. A nested type laminated structure in which a given non-embossed region 50 and a given non-embossed region 60 faced each other was taken, and a non-embossed space NE was formed. For embossed protrusions 31 and 41, each top of embossed protrusions 31 and 41 had a regular triangle shape (triangle shape) having each side (length and width) of 1.1 mm; and the number of pieces for each of the crepe paper 10 and the crepe paper 20 was 2172 pieces/144 cm² (see FIGS. 18 to 20). Additionally, an area ratio of tops to each of the crepe paper 10 and the crepe paper 20 was 8.1%. The other conditions were the same as those in Example 2. Table 1 showed conditions and results in Comparative Example 2.

TABLE 1

| | EXAMPLE 1 | EXAMPLE 2 | EXAMPLE 3 | COMPARATIVE EXAMPLE 1 | COMPARATIVE EXAMPLE 2 |
|---|---|---|---|---|---|
| BULK [mm] | 2.4 | 3.0 | 3.1 | 2.4 | 3.3 |
| BASIS WEIGHT [g/m²] | 22.2 | 21.5 | 21.4 | 22.1 | 21.7 |
| LAMINATED STRUCTURE | NESTED | NESTED | NESTED | TIP TO TIP | NESTED |
| DESIGN ARRANGEMENT OF FRONT AND BACK | — | LINE SYMMETRY | LINE SYMMETRY | — | — |
| PROTRUSION HEIGHT [mm] | 1.1 | 1.1 | 1.1 | 1.1 | 1.1 |
| TAPER (°) | 70.0 | 70.0 | 70.0 | 70.0 | 70.0 |

| | PRESENCE OR ABSENCE OF LINEAR EMBOSSED PORTION | | | | |
|---|---|---|---|---|---|
| | PRESENCE | PRESENCE | PRESENCE | ABSENCE | ABSENCE |
| SHAPE OF EMBOSSED PROTRUSION | DOT  LINE | DOT  LINE | DOT  LINE | SQUARE | TRIANGLE |
| LENGTH [mm] | 1.2  28.7 | 1.2  20.0 | 1.2  7.0 | 1.1 | 1.1 |
| WIDTH [mm] | 0.6  0.6 | 1.2  0.6 | 1.2  0.6 | 1.1 | 1.1 |
| NUMBER OF PIECES [PIECES] | 1970  15 | 960  56 | 960  144 | 3250 | 2172 |
| AREA RATIO OF TOPS OF GIVEN EMBOSSED PROTRUSIONS [%] | 7.7  1.8 | 9.6  4.7 | 9.6  4.2 | 13.7 | 8.1 |
| AREA RATIO FOR TOPS OF EMBOSSED PROTRUSIONS [%] | 81.2  18.8 | 69.9  33.8 | 69.9  30.4 | — | — |
| TOTAL AREA RATIO OF TOPS OF EMBOSSED PROTRUSIONS [%] | 9.5 | 14.3 | 13.8 | 13.7 | 8.1 |
| DROP AMOUNT OF OIL [g] | 3.1 | 3.1 | 3.0 | 3.2 | 3.1 |
| AMOUNT OF OIL ABSORBED INTO TEST PIECE [g] | 2.3 | 2.3 | 2.2 | 2.2 | 2.2 |
| RETURN AMOUNT [g] | 0.5 | 0.5 | 0.4 | 0.4 | 0.4 |
| BLEED AMOUNT [g] | 0.4 | 0.4 | 0.4 | 0.6 | 0.5 |
| RATIO OF OIL ABSORBED INTO TEST | 72.6 | 72.8 | 73.6 | 68.7 | 72.4 |

TABLE 1-continued

|  | EXAMPLE 1 | EXAMPLE 2 | EXAMPLE 3 | COMPARATIVE EXAMPLE 1 | COMPARATIVE EXAMPLE 2 |
|---|---|---|---|---|---|
| PIECE TO DROP AMOUNT OF OIL [%] |  |  |  |  |  |
| BLEED RATE [%] | 15.2 | 14.9 | 14.5 | 19.3 | 15.5 |
| RETURN RATE [%] | 12.3 | 12.2 | 11.9 | 12.0 | 12.2 |
| OIL ABSORPTION RATE [s] | 28.7 | 30.6 | 37.9 | 51.8 | 40.3 |

From Table 1, when results for an oil absorption test were compared, in Examples 1 to 3, an oil absorption rate of a test piece relative to an drop amount of oil was 72% or more; a return rate was around 12%; and a bleed rate was around 15%. Each of these was approximately equal or better compared to that in each of Comparative Examples 1 and 2. From this result, it was found that an absorption performance under load was maintained or improved with respect to a paper towel 100 in which each non-embossed region 50 faced each embossed line 41B and in which a non-embossed region 60 faced a given embossed line 31B.

When results for an oil absorption rate were compared, an oil absorption rate was 40 seconds or more in each of Comparative Examples 1 and 2, while an oil absorption rate was less than 40 seconds in each of Examples 1 to 3. From this result, it was found that an absorption oil rate was high and diffusivity of absorbed oil were improved with respect to a paper towel 100 in which each non-embossed region 50 faced a given embossed line 41B and in which each non-embossed region 60 faced a given embossed line 31B.

Additionally, in the first to third embodiments, in comparing designs, because embossed lines 31B and 41B and non-embossed regions 50 and 60 were disposed throughout a paper towel 100, a design was not inferior to a design in Comparative examples 1 and 2 (a configuration having a non-embossed space NE). From this result, it was found that the paper towel 100, in which each non-embossed region 50 faced a given embossed line 41B and in which each non-embossed region 60 faced a given embossed line 31B, had a similar level of a design to a configuration in which a non-embossed space NE was formed.

The preferred embodiments of the present invention have been described in detail above. However, the present invention is not limited to a specific embodiment and Example, and various modifications and changes can be made within a scope of the invention set forth in the claims.

This International application claims priority under Japanese Patent Application No. 2017-167503, filed Aug. 31, 2017, the entire contents of which are hereby incorporated by reference.

REFERENCE SIGNS LIST

100 paper towel
10 crepe paper
20 crepe paper
30 embossed region
31 embossed protrusion
31A embossed dot
31B embossed line
32 non-embossed protrusion
40 embossed region
41 embossed protrusion
41A embossed dot
41B embossed line
42 non-embossed protrusion
50 non-embossed region
60 non-embossed region
P1 passage
P2 passage
C1 curved portion
C2 curved portion
CP1 curved passage
CP2 curved passage
S1 intersection
S2 intersection
NE non-embossed space

The invention claimed is:

1. A hygienic thin-leaf paper comprising
a first sheet including one or more first embossed sheet portions in each of which one or more first embossed protrusions and one or more first non-embossed-protrusion portions are included, the first sheet including one or more first non-embossed sheet portions in each of which a first embossed protrusion and a first non-embossed-protrusion portion are not included, and the first sheet having a first inner surface and a first outer surface; and
a second sheet including one or more second embossed sheet portions in each of which one or more second embossed protrusions and one or more second non-embossed-protrusion portions are included, the second sheet including one or more second non-embossed sheet portions in each of which a second embossed protrusion and a second non-embossed-protrusion portion are not included, and the second sheet having a second inner surface and a second outer surface,
wherein the first sheet and the second sheet are integrally laminated such that the first inner surface of the first sheet faces the second inner surface of the second sheet,
wherein the first embossed protrusions include multiple first dotted embossed protrusions and multiple first linear embossed protrusions,
wherein the second embossed protrusions include multiple second dotted embossed protrusions and multiple second linear embossed protrusions,
wherein the first inner surface of the first sheet at the first non-embossed sheet portions faces the second inner surface of the second sheet at the second linear embossed protrusions, and
wherein the second inner surface of the second sheet at the second non-embossed sheet portions faces the first inner surface of the first sheet at the first linear embossed protrusions.

2. The hygienic thin-leaf paper according to claim 1, wherein either or both of the first linear embossed protrusions and the second linear embossed protrusions include respective curved portions.

3. The hygienic thin-leaf paper according to claim 2, wherein either or both of the first linear embossed protrusions and the second linear embossed protrusions include two linear embossed protrusions in parallel.

4. The hygienic thin-leaf paper according to claim 3, wherein either or both of the first linear embossed protrusions and the second linear embossed protrusions include two intersecting linear embossed protrusions.

5. The hygienic thin-leaf paper according to claim 4, wherein at least one from among an area ratio of tops of the first linear embossed protrusions to the first sheet; and an area ratio of tops of the second linear embossed protrusions to the second sheet is between 0.5% and 10%.

6. The hygienic thin-leaf paper according to claim 5, wherein at least one from among an area ratio of the tops of the first linear embossed protrusions to tops of the first embossed protrusions; and an area ratio of the tops of the second linear embossed protrusions to tops of the second embossed protrusions is between 10% and 40%.

7. The hygienic thin-leaf paper according to claim 6, wherein at least one from among an area ratio of the tops of the first embossed protrusions to the first sheet; and an area ratio of the tops of the second embossed protrusions to the second sheet is between 5% and 25%.

8. The hygienic thin-leaf paper according to claim 7, wherein with respect to either or both of the first linear embossed protrusions and the second linear embossed protrusions, each linear embossed protrusion has a top width of 0.3 to 1.5 mm and a top length of 4.0 mm to 50.0 mm.

9. The hygienic thin-leaf paper according to claim 7, wherein a first embossed pattern of the first embossed protrusions each of which faces the second sheet is symmetric with respect to a second embossed pattern of the second embossed protrusions each of which faces the first sheet.

10. The hygienic thin-leaf paper according to claim 9, wherein the first embossed pattern and the second embossed pattern are line-symmetric.

11. The hygienic thin-leaf paper according to claim 10, wherein the first sheet and the second sheet are integrated to be a nested type.

12. The hygienic thin-leaf paper according to claim 1, wherein either or both of the first linear embossed protrusions and the second linear embossed protrusions include two linear embossed protrusions in parallel.

13. The hygienic thin-leaf paper according to claim 1, wherein either or both of the first linear embossed protrusions and the second linear embossed protrusions include two intersecting linear embossed protrusions.

14. The hygienic thin-leaf paper according to claim 1, wherein at least one from among an area ratio of tops of the first linear embossed protrusions to the first sheet; and an area ratio of tops of the second linear embossed protrusions to the second sheet is between 0.5% and 10%.

15. The hygienic thin-leaf paper according to claim 1, wherein at least one from among an area ratio of tops of the first linear embossed protrusions to tops of the first embossed protrusions; and an area ratio of tops of the second linear embossed protrusions to tops of the second embossed protrusions is between 10% and 40%.

16. The hygienic thin-leaf paper according to claim 1, wherein at least one from among an area ratio of tops of the first embossed protrusions to the first sheet; and an area ratio of tops of the second embossed protrusions to the second sheet is between 5% and 25%.

17. The hygienic thin-leaf paper according to claim 1, wherein with respect to either or both of the first linear embossed protrusions and the second linear embossed protrusions, each linear embossed protrusion has a top width of 0.3 to 1.5 mm and a top length of 4.0 mm to 50.0 mm.

18. The hygienic thin-leaf paper according to claim 1, wherein a first embossed pattern of the first embossed protrusions each of which faces the second sheet is symmetric with respect to a second embossed pattern of the second embossed protrusions each of which faces the first sheet.

19. The hygienic thin-leaf paper according to claim 18, wherein the first embossed pattern and the second embossed pattern are line-symmetric.

20. The hygienic thin-leaf paper according to claim 1, wherein the first sheet and the second sheet are integrated to be a nested type.

\* \* \* \* \*